United States Patent
Grover et al.

(10) Patent No.: US 11,873,633 B2
(45) Date of Patent: *Jan. 16, 2024

(54) SYSTEMS TO MONITOR A TOILET BOWL AND TO DETERMINE A BOWL STATUS

(71) Applicant: AS America, Inc., Piscataway, NJ (US)

(72) Inventors: David Grover, Stockton, NJ (US); Mahendra Gunawardena, Hillsborough, NJ (US); Chris Helmstetter, Langhorne, PA (US); Verne Myers, Fort Wayne, IN (US)

(73) Assignee: AS America, Inc., Piscataway, NJ (US)

( * ) Notice: Subject to any disclaimer, the term of this patent is extended or adjusted under 35 U.S.C. 154(b) by 164 days.

This patent is subject to a terminal disclaimer.

(21) Appl. No.: 17/308,129

(22) Filed: May 5, 2021

(65) Prior Publication Data
US 2021/0254323 A1   Aug. 19, 2021

Related U.S. Application Data

(63) Continuation of application No. 15/643,086, filed on Jul. 6, 2017, now Pat. No. 11,091,903.
(Continued)

(51) Int. Cl.
*E03D 5/10* (2006.01)
*E03D 1/14* (2006.01)
(Continued)

(52) U.S. Cl.
CPC ............... *E03D 5/105* (2013.01); *G01S 15/88* (2013.01); *E03D 1/142* (2013.01); *E03D 1/34* (2013.01); *E03D 11/13* (2013.01)

(58) Field of Classification Search
None
See application file for complete search history.

(56) References Cited

U.S. PATENT DOCUMENTS

| | | | | |
|---|---|---|---|---|
| 4,034,423 A | * | 7/1977 | Milnes | E03D 5/024 4/375 |
| 5,195,058 A | * | 3/1993 | Simon | G01F 23/2962 367/908 |

(Continued)

FOREIGN PATENT DOCUMENTS

| | | | | |
|---|---|---|---|---|
| WO | WO-0246541 A1 | * | 6/2002 | E03D 5/105 |
| WO | WO-2015148771 A1 | * | 10/2015 | E03C 1/05 |
| WO | WO-2016073651 A1 | * | 5/2016 | E03D 5/10 |

OTHER PUBLICATIONS

Texas Instruments, Inc. "TDC1000 Ultrasonic Sensing Analog Front End (AFE) for Level Sensing, Flow Sensing, Concentration Sensing, and Proximity Sensing Applications", SNAS648A, Dec. 2014. (Year: 2014).*

*Primary Examiner* — Erin Deery
(74) *Attorney, Agent, or Firm* — Anna-lisa L. Gallo; Tyler A. Stevenson

(57) ABSTRACT

A method and system having a water-flush toilet having a toilet bowl that is in fluid communication with a water source and is mounted with a sensor. The sensor includes a transmitter to transmit an ultrasonic signal and a receiver to receive an ultrasonic signal. The sensor may measure a Time of Flight (ToF) of the signal to obtain a ToF measurement. A microcontroller is electrically connected to the sensor and may receive and process the ToF measurement using an algorithm to determine a bowl status. The toilet also includes at least one water valve that is disposed between the bowl and the water source, and that is electrically connected to the microcontroller for instructing the at least one water valve to move from a first position to a second position for a duration of time, wherein the duration of time corresponds to the bowl status.

20 Claims, 13 Drawing Sheets

Related U.S. Application Data

(60) Provisional application No. 62/359,696, filed on Jul. 7, 2016.

(51) Int. Cl.
*E03D 1/34* (2006.01)
*G01S 15/88* (2006.01)
*E03D 11/13* (2006.01)

(56) References Cited

U.S. PATENT DOCUMENTS

| | | | | |
|---|---|---|---|---|
| 6,058,519 | A | * | 5/2000 | Quintana ............ E03D 1/00 73/304 C |
| 6,250,601 | B1 | * | 6/2001 | Kolar ............ G01S 7/41 251/129.04 |
| 6,367,096 | B1 | * | 4/2002 | Quintana ............ E03D 1/00 4/427 |
| 2001/0011391 | A1 | * | 8/2001 | Rozenblatt ............ E03C 1/28 4/321 |
| 2015/0268342 | A1 | * | 9/2015 | Iott ............ G01S 17/06 222/1 |
| 2016/0083949 | A1 | * | 3/2016 | Plas ............ E03D 5/105 4/420 |

* cited by examiner

NORMAL WATER LEVEL

URINE DETECTION, LOW VOLUME FLUSH

SOLIDS DETECTION, FULL VOLUME FLUSH

OVERFLOW DETECTION, WATER SUPPLY SHUTOFF

SYSTEMS TO MONITOR A TOILET BOWL AND TO DETERMINE A BOWL STATUS

CROSS REFERENCE TO RELATED APPLICATIONS

This application is a continuation of U.S. application Ser. No. 15/643,036, filed Jul. 6, 2017, pending, which claims benefit of U.S. provisional app. No. 62/359,696, filed Jul. 7, 2016, the disclosures of which hereby incorporated herein by reference.

BACKGROUND OF THE INVENTION

Water conservation is rapidly becoming a concern, with both individual consumers and local and national governments for numerous economic and environmental reasons. Toilet flushing is the single highest use of water in the average home in geographies where water flush toilets are predominant. The average person flushes about five times a day; thus, toilets make up about 31% of overall household water consumption.

To aid in managing the amounts of water used, the "dual flush" toilet was developed. The dual flush toilet provides its users with a "low volume flush" option (usually about 2 to 4.5 liters) and a "high volume" flush option (usually about 4 to about 9 liters). The option selected depends on the contents of the toilet bowl after use, with the flush disposal of liquid waste requiring only use of the "low volume" option while the "high volume" option could be used for solid waste disposal. When used properly, the dual flush toilet can reduce consumption of water by as much as 50%.

However, the dual flush toilet is imperfect in that selection of "low" versus "high" flush volume is left to the discretion of the human user, who often forgets or becomes confused and inadvertently uses the "high flush" volume in circumstances where the only low flush volume is needed.

Several prior art attempts to remove the decision from the users' purview by developing toilet bowls that are able to detect the toilet contents and alter the flush have been made. These attempts have primarily focused on use of infrared detection systems within or at the inlet of the bowl and/or detection of indirect data permitting a probable inference of the contents of the bowl, for example, the proximity of the user to the toilet, the usage time, and/or the presence/absence of "fecal gases."

For example, U.S. Pat. No. 8,434,172 B2, titled "Dual Flush Electronic Flush Valve," granted May 7, 2013, describes use of an infrared sensor that periodically "polls" the location of the toilet user during toilet use to determine if the user is primarily located in a "short zone" or a "long zone" during use. If the user was predominately in the short zone, i.e., closer to the toilet, the system assumes that the user deposited solid waste, and a longer flush with more water is automatically used. If the user was predominately in the long zone, i.e., farther from the toilet, the system assumes that the user deposited liquid waste and a shorter flush with less water is automatically employed.

U.S. Pat. No. 6,226,807, titled "System and Method For A Reduced Water Consumption Vacuum Toilet," discloses a vacuum toilet that contains a weight sensor to sense the amount of weight applied to the bowl of the toilet. The sensor detects whether the user is standing or sitting when using the toilet by measuring the presence or absence of weight applied to the bowl. If weight is detected, a flush control unit connected to the sensor commands that a standard amount of water is used to flush the toilet. If the sensor detects no weight (indicating that the user has stood), the flush control unit commands a small amount of water to be used in the flush.

In another example, U.S. Pat. No. 4,707,867, titled "Toilet-Flushing Control Apparatus," teaches an apparatus that includes a detector (optical, heat sensor, or other detector that detects the presence of a user on the toilet), a delay circuit, a judging circuit, a first timer, a second timer, and a flush valve. The detector detects that a person is using a toilet, and outputs a signal which is input to the delay circuit. Upon lapse of a predetermined time after receiving this signal, the delay circuit supplies a signal to the judging circuit. When the signal of the detector lasts shorter than a reference time, the judging circuit determines that the toilet user has urinated. Conversely, when this signal lasts for the reference time or a longer time, the judging circuit determines that the toilet user has defecated. In the first case, the first timer is operated, and the flush valve opens for the time set to the first timer, thereby flushing the toilet. In the second case, the second timer is operated, and the flush valve opens for the time set to the second timer, thus flushing the toilet. The time set to the first timer is shorter than that set to the second timer. Hence, the toilet is flushed with a small amount of water after each urination and with a large amount of water after each defecation.

U.S. Patent Application No. 2008/0078014 A1, titled "Automatic Dual Flush Activation," discloses methods of automatically controlling the flush volume of a flush valve by detecting the usage time of a toilet user (i.e., the time the user spends using the toilet). If the usage time is determined to be "long" when compared to a set of preprogrammed values, a full flush volume is used. Conversely, if the usage time is determined to be "short," a lesser flush volume is used. The usage time is determined by timing the presence of the user on/near the toilet using any one of a variety of sensor type: infrared, capacitance, weight, thermal, motion, or combination thereof.

EP 0 453 702 A1, titled "An Automatic Flushing Device for a Flush Toilet," discloses an automatic flushing device for a flush toilet that includes an infrared sensor and an electronic circuit connected with the infrared sensor. The infrared sensor detects the length of time the toilet has been used and actuates the electronic circuit to energize a coil to move magnetically up a round block connected with a rhomboidal ball which blocks an outlet capable of dispensing three flush volumes. Depending on the amount of time the user has spent on the toilet, the tank is unblocked for the corresponding appropriate flush volume.

JPH 0270839, titled "Water Saving Device of Tank System Water Closet," describes a device that detects whether the user has urinated or defecated, based upon the user's stay on the toilet, and automatically adjusts the "constitution of the flush" to save water.

DE 19825229 C1, granted Feb. 17, 2000, and titled "Lavatory Flush Regulating System" describes a device that has a sensor unit to detect the bowl's contents and provide information for automatic dosing of flush water dependent upon the content. The sensor unit is a gas sensor that recognizes fecal gases. The sensor's signals are processed in a control unit, which operates a valve to supply a suitable optimum water volume for a flush to the lavatory bowl.

Water is also unnecessarily consumed when a toilet "runs"—that is, small amounts of water constantly run or flow into the bowl from the tank as a consequence of a leaky valve, malfunctioning float arm or other malfunction. Attempts to monitor toilets for this malfunction have been made, for example, U.S. Pat. No. 8,310,369 (the '369 patent). The '369 patent teaches use of a sensor that produces a signal having an amplitude corresponding to sound and/or vibration detected by the sensor, and which may include a piezo-electric sensor to detect or monitor leaks.

Thus, there remains a need in the art for a system that can be used in conjunction with a water flush toilet that automatically, without user participation, adjusts the flow volume of water into the toilet bowl depending on the contents or state of the toilet bowl.

BRIEF SUMMARY OF THE INVENTION

Advantageously, the technology of the invention removes from the water flush toilet user the conundrum of deciding, among the possible flush volumes he can select, which to use depending on the contents of the toilet bowl. As a consequence, increased water conservation is achieved, since each flush utilizes the least volume of water necessary to clear the bowl of the identified waste. Similarly, the system of the invention can be adapted to detect, for example, a clog of the toilet bowl outlet and/or a leaking flush valve, and "automatically," without human intervention, reduce the volume of water flow to the bowl (or tank) to zero.

Specifically, the invention described herein includes a water-flush toilet that includes a toilet bowl that is in fluid communication with a water source and is mounted with a sensor system. The sensor system may include a transducer capable of transmitting an ultrasonic signal and receiving a return signal. The sensor system may include a transmitter to transmit an ultrasonic signal and a receiver to receive an ultrasonic signal. The sensor system is configured to measure a Time of Flight of the signal to obtain a Time of Flight measurement. Time of Flight (ToF) describes a variety of methods that measure the time that it takes for an object, particle, acoustic wave, electromagnetic wave, or other wave to travel a distance through a medium. In an embodiment of the invention, Time of Flight refers to the time it takes for a sensor signal, such as an ultrasonic signal, to travel from and return to the sensor or to travel from a transmitter to a receiver. A microcontroller is electrically connected to the sensor system and is configured to receive and process the ToF measurement using an algorithm to determine a bowl status. The toilet also includes at least one water valve that is disposed between the bowl and the water source, and that is electrically connected to the microcontroller for instructing the at least one water valve to move from a first position to a second position for a duration of time, wherein the duration of time corresponds to the bowl status.

Systems that can be mounted to a toilet including the sensor, microcontroller and optionally the at least one valve, as described above are also described.

Also included is a method of adjusting a volume of water released into a toilet bowl to correspond to a bowl status in a water flush toilet. In an embodiment, the method includes transmitting an ultrasonic signal from a transmitter that is mounted on a toilet bowl toward the contents of the toilet bowl and receiving the ultrasonic signal. Upon receipt of the signal, a ToF measurement is electronically communicated to a microcontroller. The microcontroller applies an algorithm that determines a bowl state corresponding to the ToF measurement and electronically instructs at least one electromechanically operated valve that is in fluid communication with the toilet bowl to move from a first position to a second position for a duration of time, wherein the duration of time corresponds to the bowl status. Upon the passage of the duration of time, the at least one electromechanically operated valve is moved from the second position to the first position.

Also included are methods of increasing the water conservation of a toilet, methods of detecting and ameliorating water waste from a malfunctioning toilet, methods of preventing the release of sewer gases into the environment, and methods of monitoring toilets in commercial applications.

According to an embodiment, a water flush toilet may include a toilet bowl that is in fluid communication with a water source and is mounted with a sensor comprising that comprises a transmitter capable of transmitting an ultrasonic signal, and a receiver capable of receiving an ultrasonic signal, wherein the sensor is configured to measure a Time of Flight (ToF) of the signal to obtain a ToF measurement, a microcontroller electrically connected to the sensor that is configured to receive and process the ToF measurement to determine a bowl status; and at least one water valve that is disposed between the bowl and the water source, and is electrically connected to the microcontroller for instructing the at least one water valve to move from a first position to a second position for a duration of time, wherein the duration of time corresponds to the bowl status.

According to embodiments, the water flush toilet may include a sensor that is a piezo-ceramic sensor. The sensor may be mounted at an exterior of the toilet bowl. The sensor may be mounted at an interior of the toilet bowl. The sensor may be mounted at a bottom center of the toilet bowl. The transmitter may be mounted on a first side of the bowl, and the receiver may be mounted on a second side of the bowl that is opposite the first side. The water valve may be an electromechanically operated valve. The water valve may be a solenoid valve. The water valve may be a flush valve. The water valve may be a water source valve.

According to embodiments, the bowl status may be selected from: "liquid," "solids," and "intermediary." The bowl status may be "liquid" and the flush valve may be moved from a closed position to an open position for a duration of time to release a sufficient amount of water to clear the bowl. The bowl status may be "low water" and the flush valve may be moved from a closed position to an open position for a duration of time to release a sufficient amount of water to restore a water seal. The bowl status may be "solids" and the flush valve may be moved from a closed position to an open position for a duration of time to release a sufficient amount of water to clear the bowl. The bowl status may be "intermediary" and the flush valve may be moved from a closed position to an open position for a duration of time to release a sufficient amount of water to clear the bowl. The bowl status may be selected from "leak," "liquid clog," "solid clog," and "object." The water valve may be moved from an open position to a closed position.

According to embodiments, the toilet may include a secondary sensor for detecting the presence of a user on or in a proximity of the toilet bowl that is electrically connected to the microcontroller. The secondary sensor may be an infrared (IR) sensor for detecting the presence of a user in front of the toilet bowl. The secondary sensor may be an infrared (IR) sensor for detecting the deposit of bowl contents into the toilet bowl.

According to an embodiment, a system for mounting on a water flush toilet may include a sensor electrically connected to a microcontroller including a transmitter to transmit an ultrasonic signal, and a receiver to receive the ultrasonic signal; wherein the sensor, in use, is configured to generate a ToF measurement of the signal; and a microcontroller that is configured to receive and process the ToF measurement to determine a toilet bowl status in use and is electrically connectable to at least one water valve of a water flush toilet.

According to embodiments, the sensor of the system may be configured so, in use, the transmitter is mountable on a first side of the toilet bowl and the receiver is mountable on a second side of the bowl that is opposite the first side. The sensor may be a piezo-ceramic sensor.

According to embodiments, the system may include a secondary sensor for detecting the presence of a user on or in a proximity of the toilet bowl that is electrically connectable to the microcontroller. The secondary sensor may be an infrared (IR) sensor for detecting the presence of a user in front of the toilet bowl. The secondary sensor may be an infrared (IR) sensor for detecting the deposit of bowl contents into the toilet bowl.

According to embodiments, a method of adjusting a volume of water released into a toilet bowl to correspond to a bowl status in a water flush toilet may include transmitting a ultrasonic signal from a transmitter mounted on the toilet bowl towards a bowl contents of the toilet bowl; receiving the ultrasonic signal by a receiver to determine a ToF measurement of the signal; electrically conveying the ToF measurement to a microcontroller that determines a bowl state corresponding to the ToF measurement and electronically instructs at least one electromechanically operated valve that is in fluid communication with the toilet bowl to move from a first position to a second position for a duration of time, wherein the duration of time corresponds to the toilet bowl status; and moving the at least one electromechanically operated valve from the second position to the first position, upon passage of the duration of time.

According to embodiments, the method may include the transmitter and receiver are a piezo-ceramic sensor. The determined toilet bowl status may be selected from: "liquid," "solids," and "intermediary." The at least one electromechanically operated valve may be a flush valve, the determined toilet bowl status is "liquid," the first position is a closed position, the second position is an open position, and the duration of time releases a sufficient amount of water to clear the toilet bowl. The at least one electromechanically operated valve may be a flush valve, the determined toilet bowl status is "solids," the first position is a closed position, the second position is an open position, and the duration of time releases a sufficient amount of water to clear the toilet bowl. The at least one electromechanically operated valve may be a flush valve, the determined toilet bowl status is "intermediary," the first position is a closed position, the second position is an open position, and the duration of time releases a sufficient amount of water to clear the bowl. The at least one electromechanically operated valve may be a water source valve, and the determined toilet bowl status may be selected from "leak," "liquid clog," "solid clog," and "object." The first position may be an open position, the second position is closed position, and the duration of time is indefinite.

According to an embodiment, a method of increasing water conservation of a water flush toilet comprising fitting the toilet with any of the disclosed systems.

According to an embodiment, a method of detecting and ameliorating water waste in a water flush toilet comprising periodic activation of a monitoring cycle may include transmitting an ultrasonic signal from a transmitter mounted on a toilet bowl towards a bowl contents of the toilet bowl; receiving the ultrasonic signal by a receiver which determines a ToF measurement of the signal; and electrically conveying the ToF measurement to a microcontroller that determines a bowl state corresponding to the ToF measurement, wherein when the determined bowl state is "normal," the cycle is ended but when the determined bowl state is "leak," the microcontroller electronically instructs at least one electromechanically operated valve that is in fluid communication with the toilet bowl to move from an open position to a closed position for a duration an indefinite duration of time. According to an embodiment, the activation occurs once every 24 hours.

According to an embodiment, a water-flush toilet may include a toilet bowl having an exterior surface and an interior space; and a sensor located on the exterior surface of the toilet bowl; wherein the sensor is configured to identify an activity in the interior space of the toilet bowl. The sensor may be located on a bottom of the exterior surface of the toilet bowl. The sensor may be located on a first side of the exterior surface of the toilet bowl and a receiver located on a second side of the exterior surface of the toilet bowl, wherein the transmitter and receiver are located at the same axial height on the exterior surface of the toilet bowl. The water-flush toilet may include a microcontroller in communication with the sensor, the microcontroller configured to initiate a response to the activity. The activity identified may be a presence of a solid waste in the toilet bowl and the response is to open a valve to perform a high volume flush of the water-flush toilet. The activity may be a presence of a liquid waste in the toilet bowl and the response is to open a valve to perform a low volume flush of the water-flush toilet. The activity may be a leak into the toilet bowl and the response is to close a water supply valve. The activity may be a presence of a low water level in the bowl and the response is to open a water supply valve. The activity may be a presence of a high water level in the bowl and the response is to close prevent a flush of the water-flush toilet. The high water level in the bowl is due to a solid clog in the water-flush toilet. The high water level in the bowl is due to a line clog upstream of the water-flush toilet. The activity may be presence of intermediary content and the response is to perform a low volume flush of the water-flush toilet.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments that are currently preferred. It should be understood, however, that the invention is not limited to the precise arrangements and instrumentalities shown. In the drawings.

DETAILED DESCRIPTION OF THE INVENTION

Figure 1:
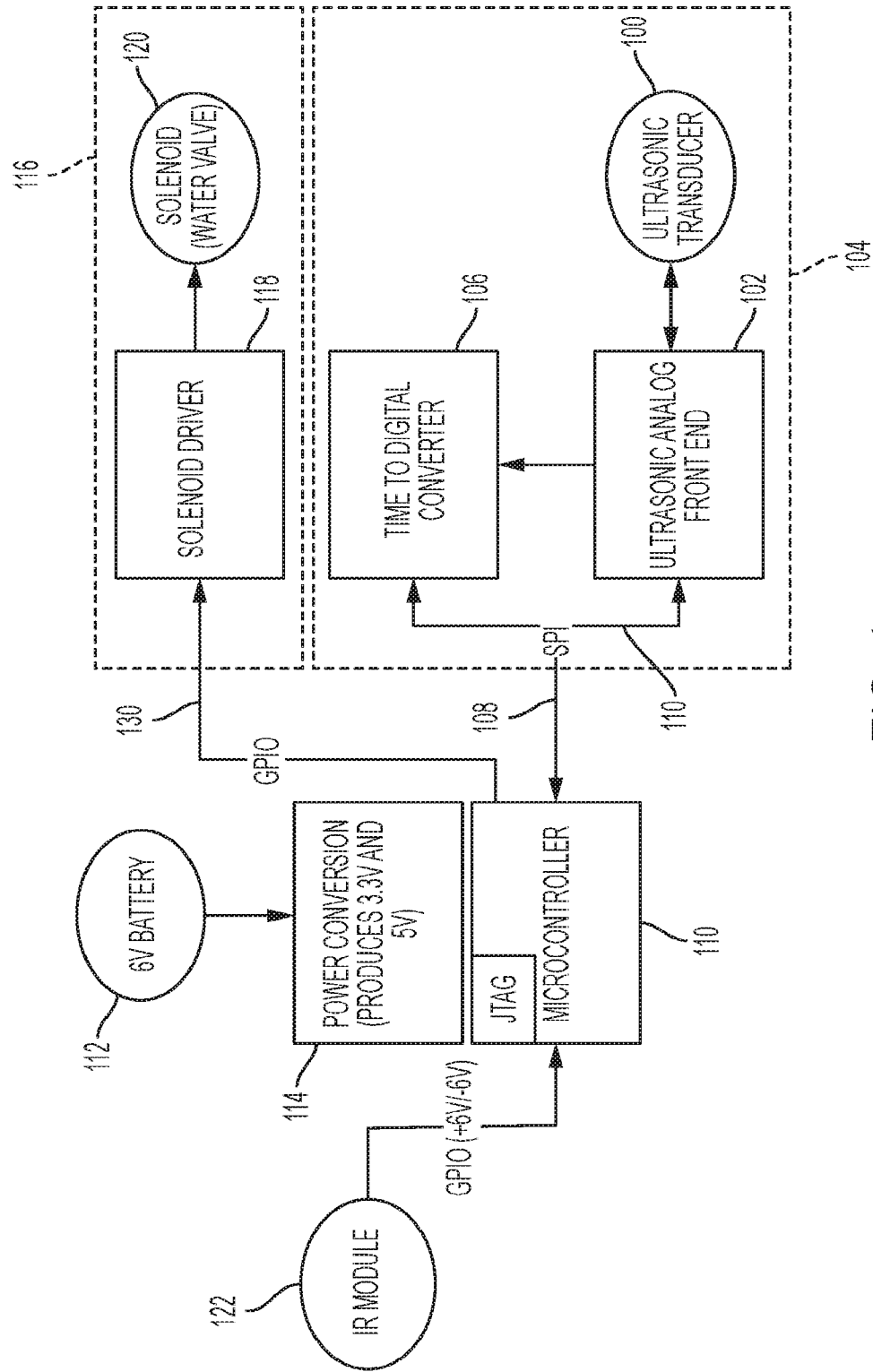
FIG. 1 is a schematic block diagram that illustrates the hardware of an embodiment of the system of the invention and includes a water valve.

The invention described herein relates to toilets mounted with systems for adjusting a water volume released into a toilet bowl depending on the status of the bowl, i.e., the amount and/or nature of the bowl contents, whether the outlet of the toilet bowl is clogged, preventing the release of sewer gases (e.g., hydrogen sulfide, ammonia, methane, esters, carbon monoxide, sulfur dioxide and nitrogen oxides) into the environment, etc.

Also included are related methods, including methods of using the system and methods of monitoring and ameliorating water waste attributable to leaks or other toilet malfunctions, and a system that can, in some embodiments, be retrofitted to existing and/or already installed toilets to improve water conservation.

Advantageously, in an aspect, the invention permits adjustment or restriction of flush volume "automatically" by the system itself, wholly in the absence of any human intervention. As a result, greater water conservation is achieved, as human error and/or negligence is removed as an obstacle. In another beneficial aspect, the invention provides a method to periodically monitor the contents of the toilet bowl to detect the addition of excess water attributable to a leak or other toilet malfunction. In this aspect of the invention, when a "leak" state in a toilet bowl is detected, the system automatically cuts off the water supply to the toilet for an indefinite period of time or at least long enough to permit the malfunction to be identified and remedied. In this way, needless water waste is reduced.

The invention includes a water flush toilet that is mounted with the system. By "water flush toilet" it is meant any toilet that disposes of liquid and solid waste by using water dispensed from a flush valve to flush it through an outlet of the toilet bowl to a drain pipe to another location for disposal. Included are, for example, flush toilets in sitting or "Western" configuration or squat configuration, as well as siphoning toilets, double trap siphonic toilets, valve closet toilets, washout toilets, and/or shelf-style toilets.

In an aspect, the invention includes a system for mounting on a water flush toilet and/or a toilet that can be adapted to permit automation of the selection of a flush volume depending on the contents of the toilet bowl and/or to permit detection of a toilet clog, leak or other similar malfunction and subsequent automated shut down of the water supply.

The system includes a sensor. The sensor may include a sensor system that includes a sensor and an analog front end. The sensor may be capable of transmitting a signal, such as an ultrasonic signal, and receiving a return signal. The analog front end may initiate the sensor to transmit a signal toward the toilet bowl contents. The signal may travel through the liquid in the toilet bowl and reflect on the intersection of the liquid and air. The transducer may accept the reflected signal and/or note and record the absence of the reflected signal.

The sensor may alternatively include at least a transmitter and a receiver. The transmitter is able, in use, to generate and transmit an ultrasonic signal toward the toilet bowl contents. The receiver is configured to accept the signal and/or to note and record the absence of a signal, in circumstances where the bowl contents are such that they attenuate or block the signal. Since the signal and/or reflected signal may be attenuated or absorbed by the contents of the bowl, as used herein, the phrase "to receive a signal" in connection with the sensor and receiver includes recognition of the absence of a signal and/or reflected signal.

The sensor system is configured to use the information obtained by the sensor about the travel of the signal to generate a time of flight measurement ("ToF measurement"). The analog front end may use an algorithm to determine the ToF measurement. In some embodiments, the ToF measurement generated is an average ToF obtained from several sets of information provided by the repeated transmission/reception of a signal. In another embodiment, the ToF measurement may be a plurality of ToF data points taken at time points during toilet use and/or for a duration of time after toilet use. The ToF measurement may also be based on a single ToF data point.

In use, the sensor system may be mounted on the outside of the bowl or in the interior of the bowl. In many embodiments, it is advantageous to mount the sensor on the outside of the bowl so as to prevent obstruction or build-up of waste soil, water minerals, and/or cleaning agents. The collection of soil, minerals, and/or cleaning agents may be unsanitary, may reduce the effectiveness of the sensor, may interfere with the sensing element, and/or may deteriorate the sensing element. By locating the sensor system on the outside of the bowl, objects within the bowl may not interfere with the sensing. That is, the objects will not damage, deteriorate, or reduce the effectiveness of the sensor.

Figure 2:
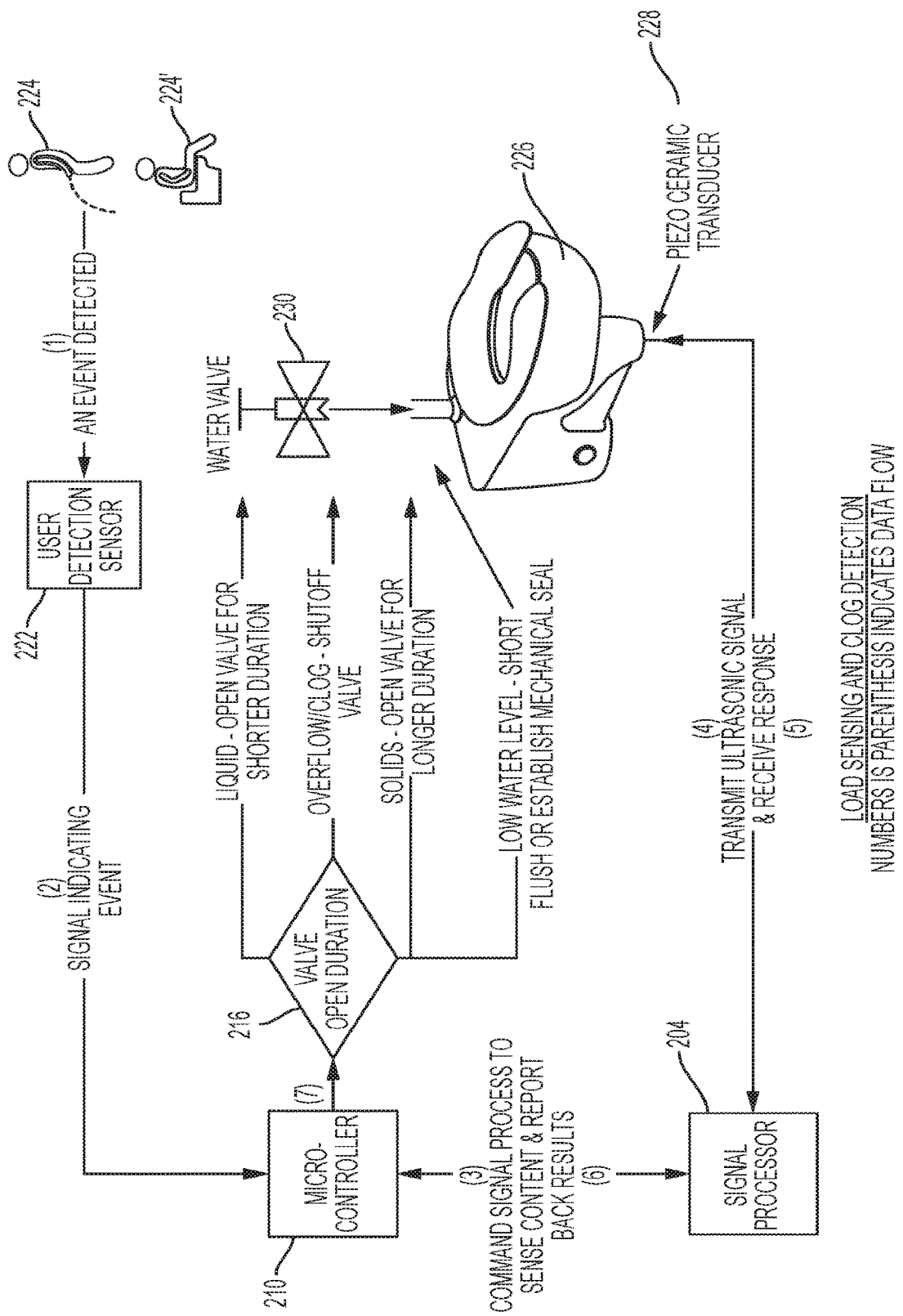
FIG. 2 is a schematic embodying the method of the invention which includes load sensing and/or clog detection and corresponding adjustment of flush volume or water flow.
Figure 4:
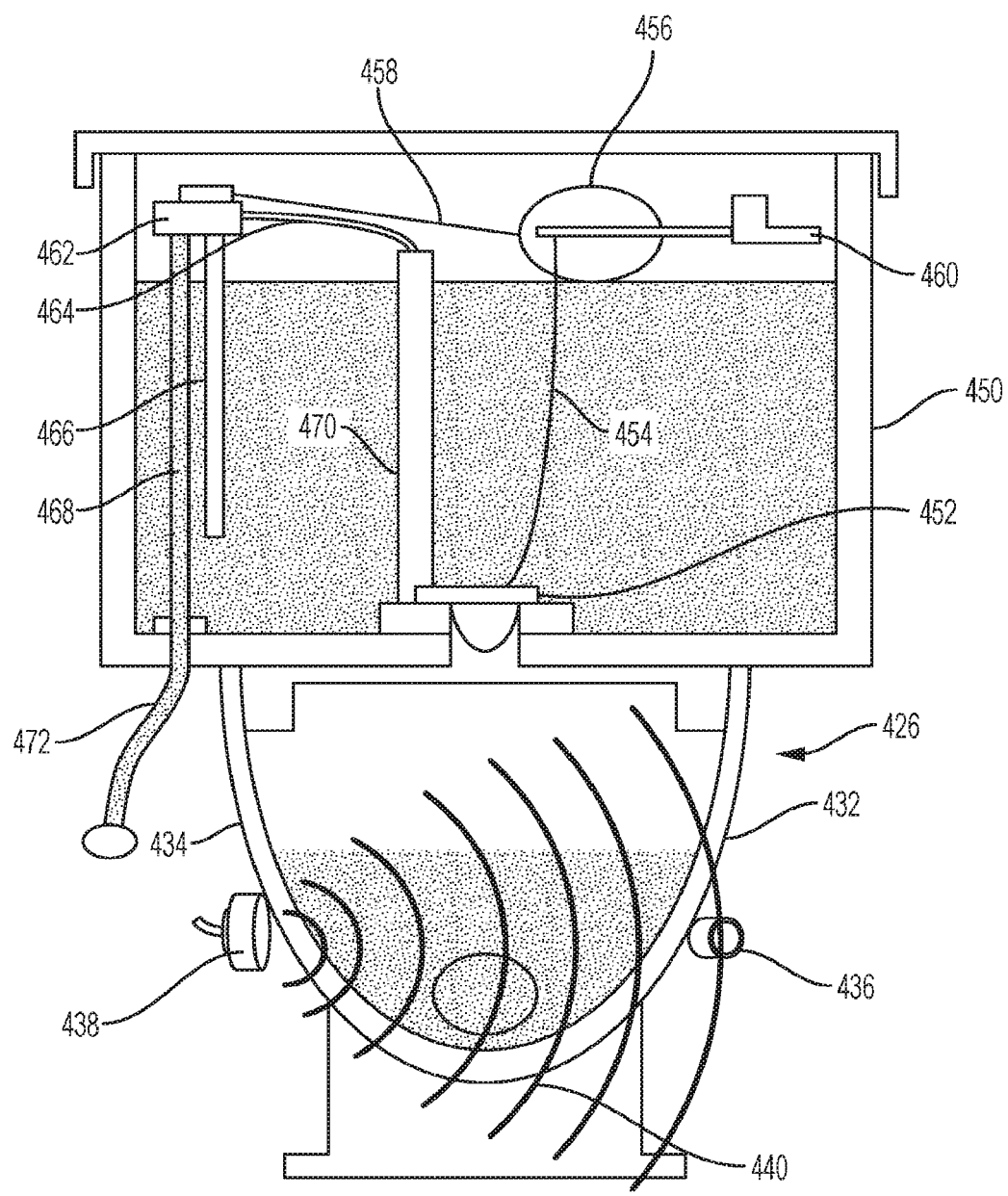
FIG. 4 is a schematic representation of a cross sectioned toilet bowl mounted with an embodiment of the system of the invention, wherein the sensor is configured so that the receiver and the transmitter are mounted on opposite sides of the exterior of the bowl.

In an embodiment, it may be preferred that the sensor is located at the center bottom of the toilet bowl (see, e.g., FIG. 2, showing position of a sensor underneath the toilet bowl) or, the sensor may be configured so that a transmitter is located on a first side of the toilet bowl, and a receiver is located on an opposite, second side (see, FIG. 4). In various embodiments, the transmitter and the receiver may be independently located on the exterior or the interior of the bowl. When the sensor (or part of the sensor) is located exterior of the bowl, it may be preferred in an embodiment that it is disposed such that it is directly adjacent to the ceramic material of the bowl, which is in turn directly adjacent to the liquid in the toilet bowl, which in turn interfaces directly with the environment (air), with no intervening spaces or layers, as shown in the schematic cross section below:

| |
|---|
| Air |
| Liquid |
| Ceramic |
| Sensor |

Similarly, if the sensor (or part of the sensor) is located interior of the bowl, it may be preferred in an embodiment that it is disposed such that it is affixed directly to the ceramic surface of the bowl, and sits directly adjacent to the liquid in the toilet bowl, which in turn interfaces directly with the environment (air), with no intervening spaces or layers, as shown in the schematic cross section below:

| |
|---|
| Air |
| Liquid |
| Sensor |
| Ceramic |

The sensor may be any ultrasonic sensor or acoustic-based technology sensor known or to be developed in the art. In an embodiment, the sensor is a piezo-ceramic transducer. Other sensors may be contemplated, such as, but not limited to, piezo-electric transducers and capacitive sensors. In embodiments where the sensor is a capacitive sensor, the sensor may operate by comparing changes in capacitance to determine water levels and bowl statuses.

The analog front end may be any device capable of initiating the sensor to send a signal and determine a ToF measurement of the signal. An exemplary analog front end (AFE) is available from Texas Instruments, Inc., 12500 TI Boulevard, Dallas, Tex. 75243 USA (e.g., TDC 1000 Ultrasonic Sensing Analog Front End (AFE) for Sensing Applications, the contents of which are incorporated herein by reference).

The sensor system may include a time-to-digital converter. The time-to-digital converter may be a TDC 7200 available from Texas Instruments, Inc. The time-to-digital converter may convert the ToF measurement received from the analog front end to a digital output for transmitting to the microcontroller.

The system also includes a microcontroller, which is electrically connected to the sensor system. The microcontroller may be located in an upper shell of the toilet, for example, near an infrared (IR) sensor on the toilet. Alternatively, the microcontroller may be located under the bowl of the toilet or on a top portion of the tank. The electrical connection between the microcontroller and the sensor system (and any others described herein) may be by traditional hard wiring or wireless electrical connection, via, for example WiFi (WLAN or WPAN may be preferred), Bluetooth, BLE, WiMAX connections. The ToF measurement generated by the sensor system (i.e., by the analog front end) is electronically conveyed by the electrical connection to the microcontroller. The microcontroller is loaded with an algorithm that permits it to receive and process the ToF measurement.

Once the ToF measurement is input, the microcontroller applies the algorithm to determine the state of the bowl ("bowl status"). The algorithm can be written to facilitate detection of a variety of bowl statuses since the ToF measurement generated by the sensor will differ depending on the state of the bowl contents (e.g., the type of media, if any, present in the bowl contents when the ToF measurement was taken). The bowl contents may be any solid, liquid, or intermediary (such as tissue), or may be the absence of content in the bowl. The variety of bowl statuses may be compared to a "normal" status. The "normal" bowl status may be determined based on a ToF measurement at a routine water level in the toilet bowl. The routine water level may be a predetermined water level. The routine water level may be predetermined based on the toilet model. The routine water level may be a water level sufficient to establish a water seal in the toilet. The "normal" status may be determined for a particular toilet model, for example, at a manufacturing facility. The "normal" status may be a set value (e.g., an average value) chosen from a set of values representing the same or similar toilet module.

It should be appreciated that the ToF measurement corresponding to each "bowl status," including the "normal" state, may differ from toilet to toilet, depending on various factors, such as bowl structure, fabrication materials and other physical parameters that affect the toilet bowl acoustics, as well as the type, quantity and nature of ToF data that is aggregated into the ToF measurement. Therefore, the algorithm applied by the microcontroller will vary. However, at a general level the algorithm includes a comparison of the generated ToF measurement to a baseline set of ToF measurements that includes ToF measurements corresponding to each of the bowl statuses for which the programmer wished to assign an adjusted flush volume, including "normal" state. For example, a programmer may assign an adjusted flush volume to a ToF measurement that corresponds to a leak, clog, lower volume, etc.

The various types of bowl statuses can be referenced using any signifiers, e.g., letters, numbers, symbols, etc. However, for convenience, the bowl statuses herein are described using simple nouns corresponding to the actual physical contents. Exemplary bowl statuses may include, without limitation: (i) the presence of solid waste in the bowl water ("solids"); (ii) the presence of liquid only in the bowl ("liquid"); (iii) the presence of continuous water running/leaking into the bowl ("leak"); (iv) a low water level in the bowl ("low"); (v) a high water level in the bowl resulting from, for example, a clog of the toilet bowl outlet (such as a line clog in a commercial application, where a clog present in a downstream portion of the system creates a clog in the upstream array of toilets) ("liquid clog"); (vi) a high water level in the bowl resulting from a solid remaining in the toilet bowl ("solid clog"); (vii) presence of intermediary content, such as paper or tissue in the bowl water ("intermediary"); (viii) the presence of a non-feces solid in bowl water (e.g., children's toy, cell phone, or other inappropriate object) ("object"); and (ix) very low water level that may permit release of sewer gases ("unsealed").

The microcontroller may be any known or developed in the art that is capable of processing the ToF measurement received from the analog front end to determine the state of the bowl ("bowl status"). The microcontroller may determine an action to be taken by the toilet system corresponding to the state of the bowl. The microcontroller may send an instruction to a flush valve, a water source valve or other valve to open, close, or remain in the current state based on the bowl status. Exemplary microcontrollers include those available from Texas Instruments, Inc., 12500 TI Boulevard, Dallas, Tex. 75243 USA (Microcontroller MSP 430) or PIC microcontroller from MicroChip of Phoenix, Ariz. The microcontroller may be an ARM-based microcontroller.

In the system of the invention, the microcontroller uses the ToF measurement within an algorithm to determine the bowl status, and electronically conveys an instruction to a water valve or valves in the system to deliver an appropriate flush volume to the bowl or to block the water source to the toilet altogether, so that no additional water enters the toilet bowl or tank.

In an embodiment, the valve is an electromechanically operated valve that may be any known or to be developed in the art. In some embodiments it may be preferred that the electromechanically operated valves are solenoid valves. The valve may also be a DC motor valve or stepper motor valve. If the embodiment involves adjustment of a flush water volume in response to a specific bowl status, the valve may be, for example, a flush valve that is disposed between the bowl and the water source (e.g., the water mains or a water tank) or a water source valve that supplies water to the toilet as a whole.

In an exemplary embodiment, when the algorithm determines that the bowl contains solid waste in the bowl contents (bowl status is "solids"), the microcontroller electronically instructs a flush valve or valves to move from a closed position to an open position for a duration of time sufficient to release a first flush volume. Correspondingly, when the microcontroller determines that the bowl contains liquid (bowl status is "liquid"), it electronically instructs the flush valve to open for a duration of time sufficient to release a second flush volume, and when the microcontroller determines that the bowl contains paper waste or other intermediary material (bowl status is "intermediary"), it instructs the flush valve to open for a duration of time sufficient to release a third flush volume, and so on. Once the appropriate volume of water has been released, the valve(s) is moved to a closed position, and the system resets. Thus, it can be appreciated that the system may allow for a customized amount of water to be flushed through the system based on the specific contents of the toilet bowl.

In each instance, the first, second, third, etc., volume may be different and may be calibrated to be just enough water ("sufficient") to clear the identified content from the bowl. The volume suitable (or sufficient) in each circumstance will differ depending on the structure of the particular toilet to which the system is mounted. However, on average, a volume of water sufficient to remove solids may be about 2.5 to 6 liters of water, a volume of water sufficient to remove liquids alone may be about 0.5 to 5 liters, and a volume of water sufficient to remove paper may be about 1 to 5 liters.

In an embodiment, when the microcontroller determines that the bowl is receiving continuous flow of water (i.e., bowl status is "leak") or contains a level of water higher than "normal" (i.e., bowl status is "liquid clog" or "solid clog"), it electrically instructs a water source valve to move from an open position to a closed position for a duration of time. By "water source valve" it is meant a valve that controls the flow of water into the toilet as a whole, not just into the toilet bowl.

In this embodiment, since the aim is for toilet overflow and/or water waste to be avoided until the particular malfunction is fixed, the duration of time may be very long, e.g., 1 to 5 hours, 10 hours, 24 hours, 48 hours, 72 hours, 100 hours or an indefinite amount of time; in any case, it may be preferred that the valve remains in a closed position for a sufficient time to enable the malfunction to be discovered, and repaired and the system reset. The system reset may be automatic based on the sensor system detecting a "normal" status of the bowl and sending a normal ToF measurement to the microcontroller. Alternatively, a user may reset the system manually, such as with a push button.

In an embodiment, the system is able to determine when the water level in the bowl is very low, i.e., sufficiently low that the mechanical water seal of the toilet may be insufficient or altogether lost. By "mechanical water seal" it is meant the water located in the toilet trap that prevents sewer gases from escaping back through the bowl outlet. As is known in the art, the dimension of a toilet water seal is described in vertical distance, i.e., the vertical distance between the trap dip and the mean level of the water. Many modern building codes require a water seal of a minimum vertical distance (e.g., 1.5 inches, 2 inches) between the mean water level and the trap dip to ensure the integrity and sufficiency of the water seal in a working system. In this way there is a physical barrier of water extending from the weir, through the trap and to 2 inches above the trap dip.

In this embodiment, the microcontroller is programmed to determine if the water level is so low that the water seal is less than the minimum vertical distance required (bowl status "low water"). If this condition is detected by the microcontroller, it electronically conveys an instruction to a water valve or valves in the system to deliver an appropriate flush volume to the bowl, such volume being at least sufficient to restore a minimum vertical distance required or desired for the water seal and therefore to maintain the water seal. As is appreciated by a person of skill in the art, such volume will vary depending on the overall dimensions of the trap and bowl.

The system may further include other secondary sensors and/or secondary devices that are capable of executing additional events in or near the toilet bowl. In some embodiments, the system may include more than one ultrasound sensor, and/or an additional sensor, such as, e.g., a gas detector, an infrared sensor, a float sensor (to detect water level), etc. In some embodiments, the secondary devices may be electrically connected to the microcontroller and, upon instruction from the microcontroller, execute an additional event. For example, before, after, or during the release of the flush valves, a secondary device could be instructed to dispense a cleaner, a deodorizer, an air freshener, a directional water stream to clean the bowl or the user, a musical ditty or other sound and/or to turn on or off a light or lights.

In an embodiment, the system includes a secondary sensor for detecting the presence of a user on or in a proximity of the toilet bowl. This secondary sensor may be, for example, an infrared (IR) sensor that is configured to detect the presence of a user in front of the toilet bowl or for detecting the deposit of content into the bowl.

In an embodiment, an infrared sensor is electrically connected to the microcontroller; when the infrared sensor detects the presence of a user, it electrically sends a signal to the microcontroller, which causes the microcontroller to prompt the transmitter of the sensor to begin transmitting the ultrasonic signal toward the bowl contents. In this way, the practice of the invention and the inventive methods described herein can be executed in the absence of any intentional human intervention.

As is apparent from the above discussion, the invention also includes water flush toilets that are mounted with the system in any permutation of elements described above. The system can be mounted on a toilet at the manufacturer and provided to the consumer as an integrated product. Alternatively, in some embodiments, the system may be provided separately to be retrofitted on existing, pre-installed toilets. In an embodiment, the system may also include the electromechanically operated valves or it may include electronically effectuated drivers that can be used to convert a conventional mechanical valve into one that can be electromechanically operated for use with the system.

Methods of increasing the water conservation of a toilet that include mounting the toilet with any of the systems described herein are also included. For example, when the system is used to detect leaks, one or more valves in the toilet may be closed to prevent further leakage of water. Additionally, conservation of water may be achieved through the programming of various flush volumes, as discussed above, thus allowing the appropriate amount of water for the bowl contents to be delivered to the toilet.

The scope of the invention also includes a method of detecting and preventing or ameliorating needless waste of water by providing a way to automatically monitor a toilet for high water levels in the toilet bowl or near continuous lower-level turbulence of the bowl contents, which is indicative of a leak or the flush valve or other malfunction. Such methods include a periodic activation of a monitoring cycle that includes: i) transmitting an ultrasonic signal from a transmitter mounted on a toilet bowl toward the contents of the toilet bowl; ii) receiving the ultrasonic signal by a receiver that determines a ToF measurement of the signal; iii) electrically conveying the ToF measurement to a microcontroller that applies an algorithm to determine a bowl state corresponding to the ToF measurement.

If the algorithm applied by the microcontroller indicates that the bowl state is "normal," the cycle is ended. If, however, the determined bowl state is "leak" or "high water" or "turbulence" or similar, the microcontroller electronically instructs at least one electromechanically operated valve that is in fluid communication with the toilet bowl to move from an open position to a closed position. The valve may remain closed until the malfunction is identified and repaired and the system is reset. The system may be reset automatically based on a new ToF measurement indicating a "normal" status or manually by the user, as previously described.

Activation of the monitoring system may be effectuated manually or may be programmed to occur at various time intervals, for example, once every 24 hours, once a week, once a month, etc. The monitoring system may be substantially continuous, such that a signal is transmitted and a ToF measurement recorded at programmed intervals, including intervals as frequent as every hour. Such substantially continuous monitoring may detect statuses such as "leaks" and "clogs" quickly and actuate the valves to open, close, or remain in the current state, or to actuate other components in the previously described manner, until the status is remedied. The frequency of monitoring may be based on application. For example, in commercial use, such as at a sports venue, the system may be programmed to send sensor signals frequently during a sporting event and be substantially dormant or asleep when the venue is vacant. In other commercial uses, such as offices or airports, the system may be programmed to monitor during office hours or high travel time periods, respectively, and remain dormant during off-hours. The microcontroller may be programmed with use schedules determining when the sensor system is monitoring and asleep.

Since water turbulence may indicate water leakage or deposition of human liquid waste from a distance, as when the toilet is being used by a male in standing position, the microcontroller's algorithm may permit distinction between lower-level turbulence (leak) and higher levels of turbulence (standing urination). When liquid is leaking into the toilet, either due to a leak in the toilet or through urination by a user, there will be an increase in turbulence in the surface of the liquid in the toilet bowl. The sensor system may be unable to determine a ToF measurement when there is turbulence. The sensor system may generate a series of "normal" ToF measurements followed by a series of "zero" ToF measurements (indicating no reflected signal or no signal received by the receiver). Therefore, the algorithm may, for example, determine a level of turbulence corresponding to a number of "zero" ToF measurements. That is, the sensor system may generate an alternating series of "normal" and "zero" ToF measurements. Where the number of "zero" ToF measurements generated is high, and does not approach a steady state of "normal" ToF measurements, there is high turbulence, and the microcontroller may determine the bowl status is "leak." As the series of "normal" and "zero" ToF measurements returns to a steady state of "normal" ToF measurements, the system may determine liquid has been deposited in the toilet bowl. Based on the determined bowl status, the microcontroller may take the appropriate action, as previously described.

Referencing FIGS. 1 to 4, various aspects and embodiments are explained with specificity to illustrate the invention. FIG. 1 is a schematic block diagram illustrating a hardware configuration of an embodiment of the system of the invention. In this embodiment, a sensor system 104 includes a sensor 100, which may be an ultrasonic transducer, such as a piezo-ceramic transducer. The sensor system 104 may include an ultrasonic analog front end (AFE) 102 that is electrically coupled with the sensor 100. The sensor system 104 may include a time-to-digital converter (TDC) 106, which converts the Time of Flight (ToF) measurement to a digital output. The TDC 106 may be omitted and the microcontroller 110 may include programming to perform the function of the TDC 106.

With continued reference to FIG. 1, the AFE 102 transmits a pulse to the sensor or ultrasonic transducer 100. The pulse causes the ultrasonic transducer 100 to resonate, thus emitting an ultrasonic signal from the transducer 100. As previously described, the ultrasonic transducer 100 may be located on an outer surface of the toilet bowl and at the base of the toilet bowl, near a lower portion (FIG. 2). The transducer 100 may be located below the normal liquid line of the toilet bowl. Thus, the ultrasonic signal travels through the liquid from the bottom of the toilet until it reaches the surface of the liquid (i.e., the intersection or barrier between the liquid in the toilet bowl and the air above the liquid in the toilet bowl). At the surface of the liquid, the ultrasonic signal is reflected and returns back to the transducer 100.

Referring again to FIG. 1, the AFE 102 may detect the signal has returned to the transducer 100. The AFE may then generate a Time of Flight (ToF) measurement corresponding to the time elapsed between the ultrasonic signal leaving the transducer 100, reflecting on the liquid/air barrier or other toilet bowl contents, and returning to the transducer 100. The ToF measurement generated by the AFE 102 may be converted to a digital output by the TDC 106. An exemplary AFE 102 is a TDC1000 and an exemplary TDC 106 is a TDC7200, both from Texas Instruments, Inc. The ToF measurement in digital form is conveyed via serial peripheral interfaces (SPI) 108 to a microcontroller 110. The microcontroller 110, in this embodiment, is powered by a battery 112 via a power conversion module 114.

Upon receipt of the ToF measurement, the microcontroller 110 processes the ToF measurement by applying an algorithm to determine the bowl status. The microcontroller 110 compares the ToF measurement to a preselected "normal" status (determined for a toilet module, as previously described). If the results of the algorithm indicate that the bowl status is other than the preselected "normal" status, the microcontroller 110 electrically conveys a signal to an electromechanically operated water valve 116 via a digital signal 130, such as a GPIO interface. The signal causes the valve 116 to move from a first position to a second position. In an embodiment, the water valve 116 may include a solenoid driver 118 to actuate a solenoid valve 120 between the first position and second position. The first and/or second position may correspond to an open position, closed position, and/or partially open position of the valve.

Referring again to FIG. 1, the embodiment may also include a secondary sensor 122 that may be an infrared sensor capable of determining the presence or absence of a user in the proximity of the toilet bowl (not shown). The secondary sensor 122 may trigger the sensor system 104 to transmit an ultrasonic signal, as will be discussed in reference to FIG. 2.

FIG. 2 is a schematic representation of the invention illustrating the system and method of detecting various bowl statuses (e.g., "clog," "liquid," "solids") and adjusting the flush volume and/or water flow to correspond to the bowl status. In this example, the sensor is a piezo-ceramic sensor 228 that is located in the bottom central portion of a toilet bowl 226. In FIG. 2, a user 224 or 224' deposits solid waste or liquid waste in the toilet bowl 226. A secondary sensor 222, such as an IR sensor, detects the user 224/224' has left the area of toilet (1) and sends a signal (2) indicating the event to the microcontroller 210 (such as microcontroller 110). The microcontroller 210 instructs (3) the signal processor 204 to transmit an ultrasonic signal (4). The sensor (such as transducer 100) of the signal processor 204 transmits the signal and receives the response signal (5). The signal processor 204 may generate a ToF measurement (for example, with an AFE 102). The signal processor 204 conveys the ToF measurement (6) to the microcontroller 210. The microcontroller 210 processes the ToF measurement to determine the bowl status, and sends a signal to a water valve 230 to adjust the water volume and duration 216 to correspond to the bowl status.

Figure 3:
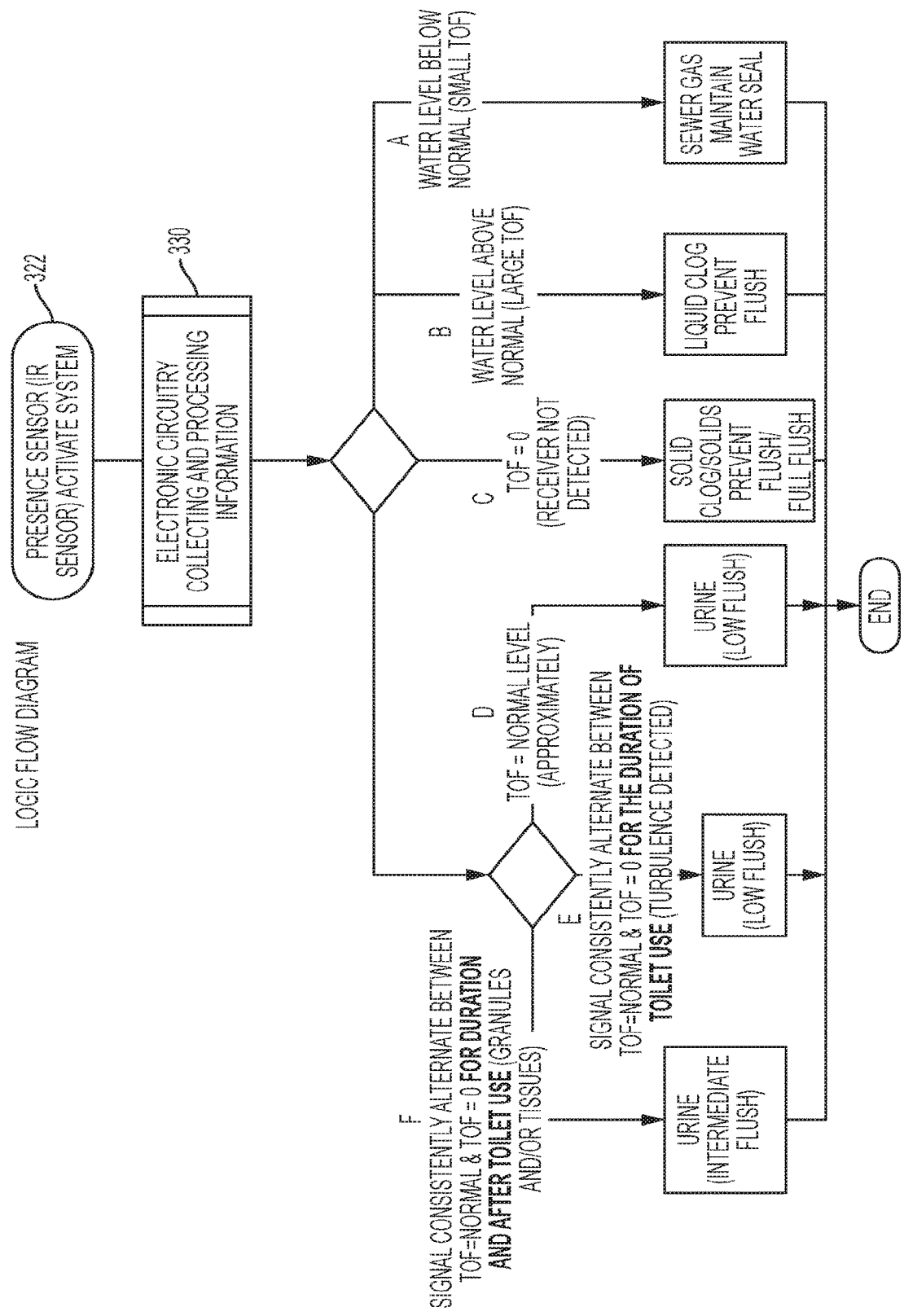
FIG. 3 is a second schematic representation of the invention illustrating a second embodiment of the system and method of detecting various bowl statuses.

FIG. 3 is a schematic representation of the invention illustrating logic flow of the system and a method to detect various bowl statuses (e.g., "low water," "liquid," "intermediary," "solids," "liquid clog," or "solid clog"). In FIG. 3, a secondary sensor 322 that may be an IR sensor is included to activate the system when it detects the presence of a user near or on the toilet. The IR sensor is electrically connected to a system 330 for collecting and processing information. The system 330 may be the system described with relation to FIGS. 1 and 2 and may include a sensor system as previously described. As previously described, an ultrasonic signal is transmitted from a sensor system and, when possible, received to obtain a ToF measurement. The ToF measurement is reported to the microcontroller, which applies an algorithm to the ToF measurement to determine the bowl status.

A "normal" ToF measurement corresponding to the Time of Flight of the sensor signal from transmitter to receiver when the toilet bowl contains water at a routine level is preselected and loaded into the algorithm. As can be seen in FIG. 3, the microcontroller is programmed to compare a ToF measurement returned by the analog front end of the sensor system to the ToF measurement at the "normal" status. When the bowl water level is above the routine level (arrow B in FIG. 3), for example, if there is a line clog (e.g., "liquid clog" status), the ToF measurement may be large compared to the "normal" ToF measurement. A large ToF measurement may be any ToF measurement that is above the ToF measurement corresponding to the "normal" status. This information is electronically conveyed to the microcontroller. The microcontroller may actuate a water source valve to move from an open position to a closed position, effectively preventing any additional water from entering the toilet or toilet bowl.

With continued reference to FIG. 3, when, for example, the bowl water level is below the routine level (arrow A in FIG. 3), the ToF measurement may be relatively small compared to the "normal" ToF measurement (e.g., "water seal" status). In other words, a "low water level" ToF measurement of the toilet bowl containing water at a very low level is present in the algorithm. When the bowl water level is lower than normal level, the ToF measurement is relatively small compared to "normal." This information is electronically conveyed to the microcontroller and as a result the microcontroller may actuate a valve to deliver an appropriate flush volume of water to the bowl. The volume in this instance being at least sufficient to restore a minimum vertical distance required or desired for the water seal and therefore to maintain the water seal and prevent escape of sewers gases into the environment. The water seal may be, for example, a mechanical water seal.

When there is solid waste (e.g., "solids" or "solid clog" status) in the liquid in the toilet bowl (arrow C in FIG. 3), the ToF measurement is 0 or near 0. The ultrasonic signal is attenuated, or absorbed, by the solids in the toilet bowl. Therefore, the signal does not reflect back to the sensor or is reflected back at a minimal level. Once this information is conveyed to the microcontroller, the microcontroller may determine whether the ToF measurement represents "solids" or "solid clog" based on historical toilet data. Such historical data may be, for example, whether the toilet has completed a prior flush. If the status is "solids," the microcontroller may actuate the flush valve to move from a closed position to an open position for a duration of time that permits a sufficient volume of water to the bowl to clear the solids from the bowl and out the toilet outlet ("a full flush"). In general this is about 3 to 5 liters of water, although amounts will vary depending on the structure of the specific toilet. This volume of water may be predetermined by the microcontroller. If the status is "solid clog," the microcontroller may prevent the valve from opening and may prevent a flush from occurring.

In a circumstance where the bowl water contains urine (e.g., "liquid" status) alone, the result of the algorithm may indicate several different states, corresponding to arrows D, E, and F in FIG. 3. For example, the ToF measurement may indicate either a ToF measurement approximately equal to the ToF measurement at a "normal" status (arrow D) or a ToF measurement approximately equal to the ToF of normal state alternating with a ToF of 0 for the duration of toilet use (arrow E). This information, once electronically conveyed to the microcontroller, causes the microcontroller to actuate a flush valve to move from a closed position to an open position for a duration of time that permits release of a sufficient volume of water to the bowl to clear the urine from the bowl and out the toilet outlet ("a low flush"). In general, this is a volume of water that is about three-quarters less than the volume needed to clear solid waste. As a rule of thumb, the volume is about 0.5 to 5 liters. This volume of water may be predetermined by the microcontroller.

When the bowl contains liquid waste and toilet paper or tissue (arrow F in FIG. 3), the result of the algorithm will indicate either a ToF at or close to the ToF of normal state alternating with a ToF of 0 for the duration of toilet use and for a duration after toilet use is completed. This information, once electronically conveyed to the microcontroller, causes the microcontroller to instruct a flush valve to move from a closed position to an open position for a duration of time that permits release of a sufficient volume of water to the bowl to clear the urine and paper/tissue from the bowl and out the toilet outlet ("an intermediate flush"). In general, this is a volume of water that is less than the volume needed to clear solid waste. It can range from about 1 to about 5 liters depending on the structure of the toilet. This volume of water may be predetermined by the microcontroller.

FIG. 4 is a schematic illustration of a cross section of a toilet. The toilet may include a tank 450 and handle 460. Inside the tank 450 may be a flush valve 452, flush valve chain 454, float ball 456, and float arm 458. The toilet may also include an inlet valve 462, bowl refill tube 464, filter tube 466, inlet tube 468, overflow tube 470, and supply line 472. The toilet in FIG. 4 may include an alternative arrangement for the sensor (transducer 100 in FIG. 1). The sensor may comprise a transmitter 438 and a receiver 436. The transmitter 438 and receiver 436 may be at the same level or same axial height on the toilet bowl 432. The transmitter 438 and receiver 436 may be parallel, with, for example, the floor, the water level in the toilet, the toilet seat, or other relative location on or near the toilet. The transmitter 438 and receiver 436 may be piezo-ceramic transducers. The transmitter 438 may be located on a first side 434 of the toilet bowl 426 and the receiver 436 may be mounted on a second side 432 of the toilet bowl 426, opposite the transmitter 438. As can be appreciated from FIG. 4, the ultrasonic signal 440 passes through the toilet bowl and the toilet bowl 426 contents when traveling from the transmitter 438 to the receiver 436. When the toilet bowl is at a state of routine water level, the ultrasonic signal 440 traverses the toilet bowl 426 in normal state. When the toilet bowl contents are other than the routine water level (as described with relation to FIG. 3), the ultrasonic signal 440 may be take more or less time to traverse the toilet bowl 426. The presences of solids or a solid clog may absorb the ultrasonic signal (i.e., the ultrasonic signal 440 is attenuated) and a signal may not be received by the receiver 436 or a minimal signal may be received. FIG. 4 may include an AFE and microcontroller as previously described to determine a ToF measurement from the signal received at the receiver 436 and thus determine a bowl status.

Figure 5:
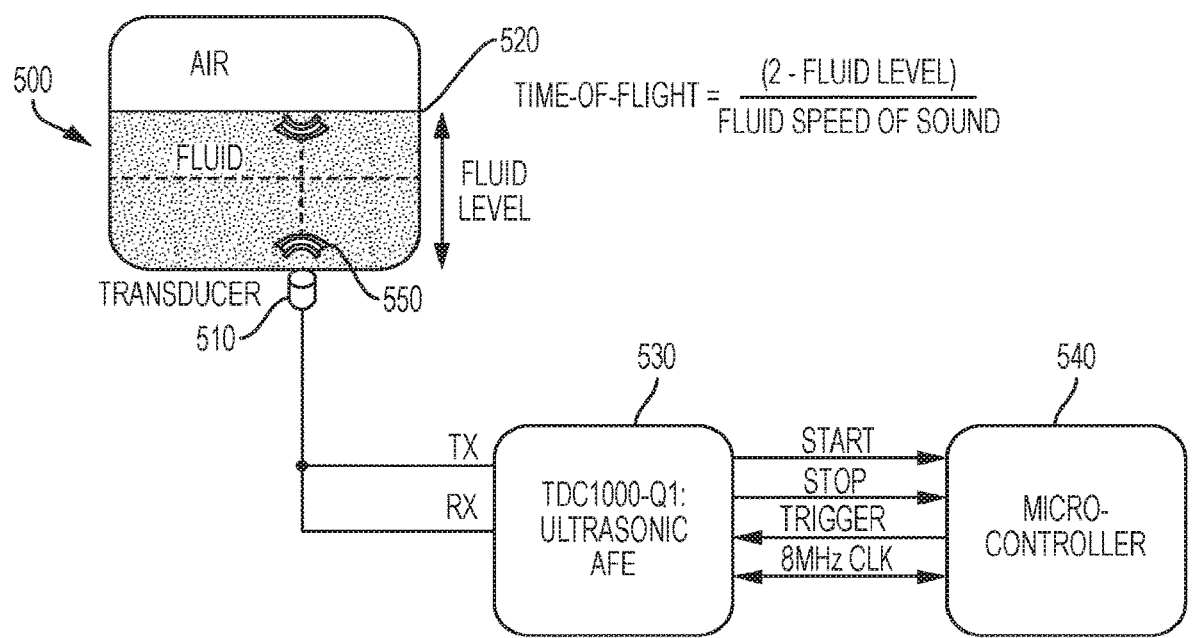
FIG. 5 is an ultrasonic level block diagram illustrating how a ToF measurement is obtained in an embodiment of the invention.

FIG. 5 is a schematic of a simple version of the system of an embodiment of the invention showing the interrelation of the sensor (transducer), related circuitry, and the microcontroller. FIG. 5 depicts a schematic toilet bowl 500 where the sensor 510 is located on a bottom, outer surface of the toilet bowl 500. The sensor 510 may be an ultrasonic transducer, such as a piezo-ceramic transducer, as previously described. The analog front end (AFE) 530 may cause the sensor 510 to resonate, thus generating an ultrasonic signal 550 which travels through the liquid in the toilet bowl 500. The signal 550 reaches the target 520, which may be a barrier or separation or interface between the fluid and the air, and is reflected back toward the sensor 510. The sensor 510 receives the signal 550 and the AFE 530 then generates a ToF measurement which is communicated to the microcontroller 540.

Figure 5A:
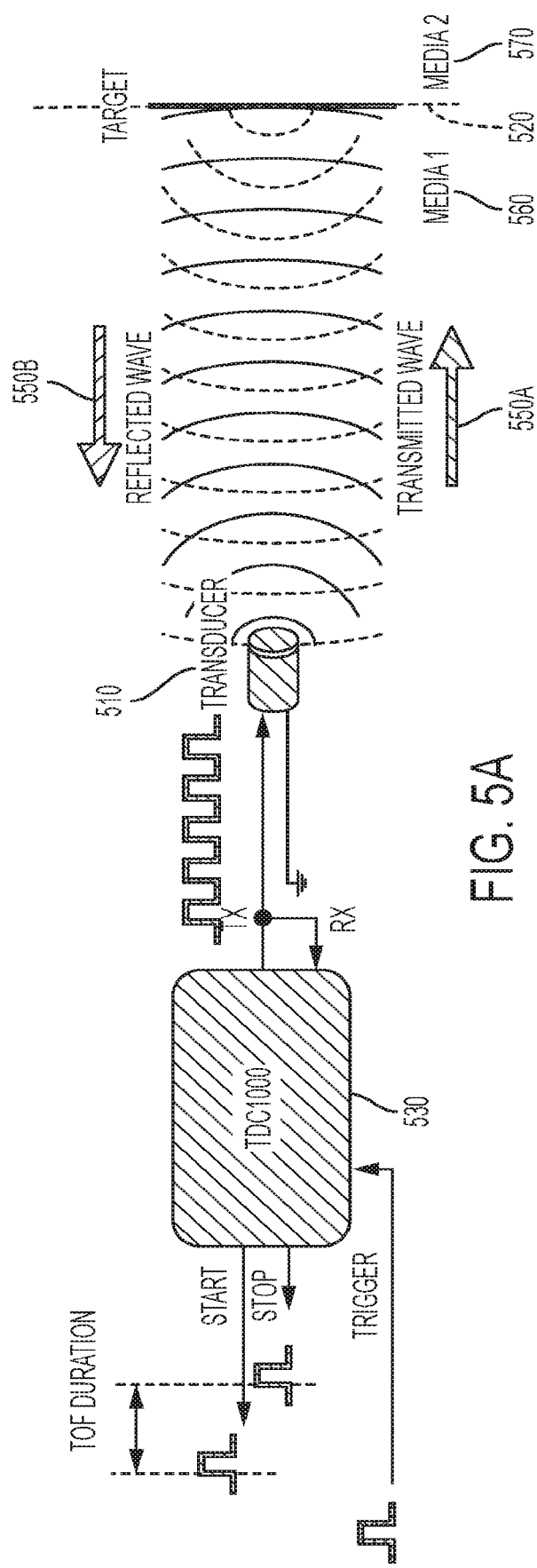
FIG. 5A is a schematic representation of a system for transmitting and receiving a signal through a media.

FIG. 5A is a schematic of a system according to the principles of the present disclosure for transmitting and receiving a signal and processing the signal to determine a Time of Flight measurement. The system of FIG. 5A may include a sensor or transducer 510, such as an ultrasonic transducer or piezo-ceramic transducer, as previously described. The sensor or transducer 510 may be electrically connected to an analog front end (AFE) 530. The AFE 530 may initiate the transducer 510 to resonate, thus generating a signal 550A, such as an ultrasonic signal. The signal 550A will transmit through a first media 560 (such as, in the example of FIG. 5, a liquid or water). When the signal reaches a target 520, such as a barrier or transition between the first media 560 and a second media 570, the signal may be reflected back to the transducer 510 as a return signal 550B. The target 520 may be a solid barrier or target or may be a transition between two media, such as the first media 560 and the second media 570. The first media 560 may be, for example, a liquid or water (such as is present in a toilet bowl) and the second media 570 may be, for example, air (such as is present above the liquid or water in a toilet bowl). The target 520 may also be the wall of a toilet bowl; in this situation, the AFE 530 may be programmed to ignore these reflections and only determine a ToF measurement for signals reflected off an object in the toilet bowl or the liquid/air transition in the toilet bowl. When the return signal 550B is received by the transducer 510, the signal is communicated to the AFE 530, which then determines a ToF measurement from when the signal is initiated in the transducer 510 to when the signal is returned to the transducer 510. It can thus be appreciated that the ToF measurement may vary based on the media 560, 570 and the target 520 due to ultrasonic signals traveling at varying speeds through different media.

Figure 6:
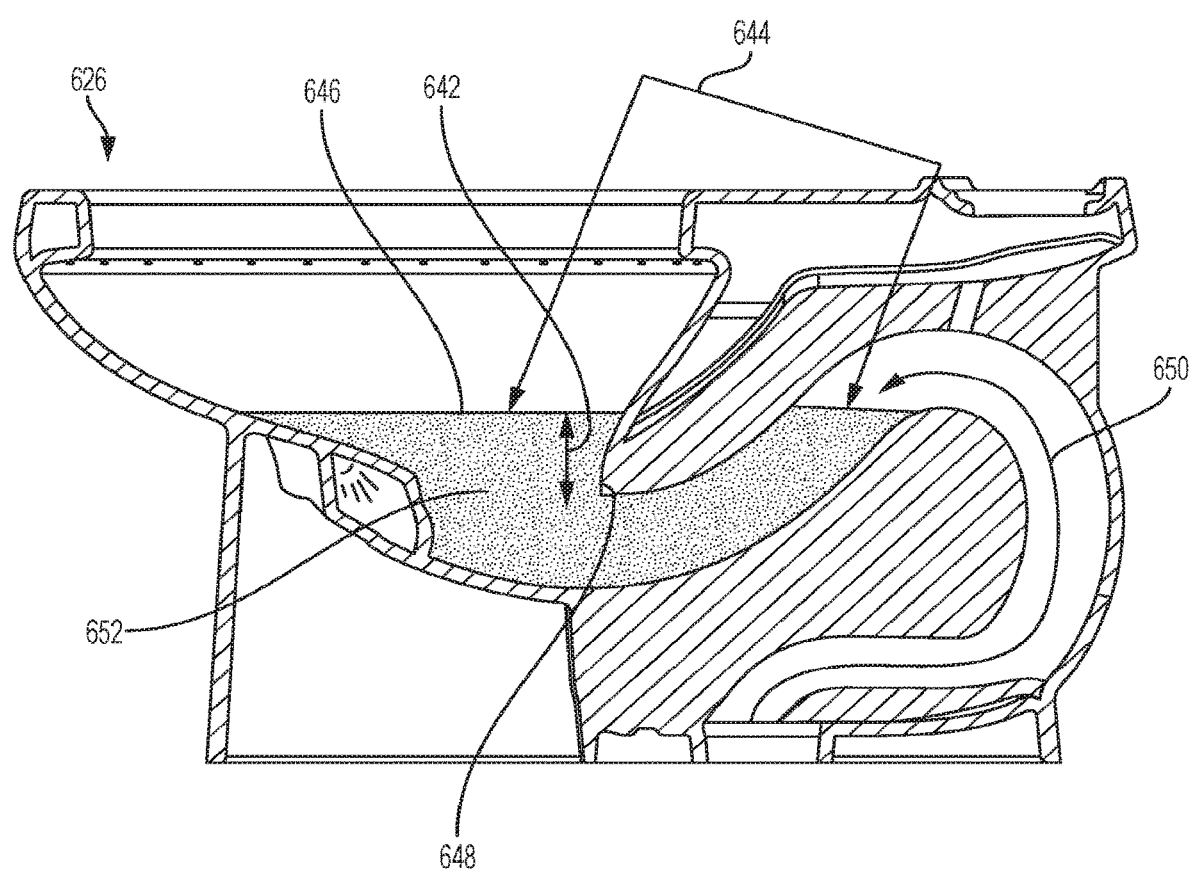
FIG. 6 is a cross section of a toilet with an intact water seal.
Figure 7:
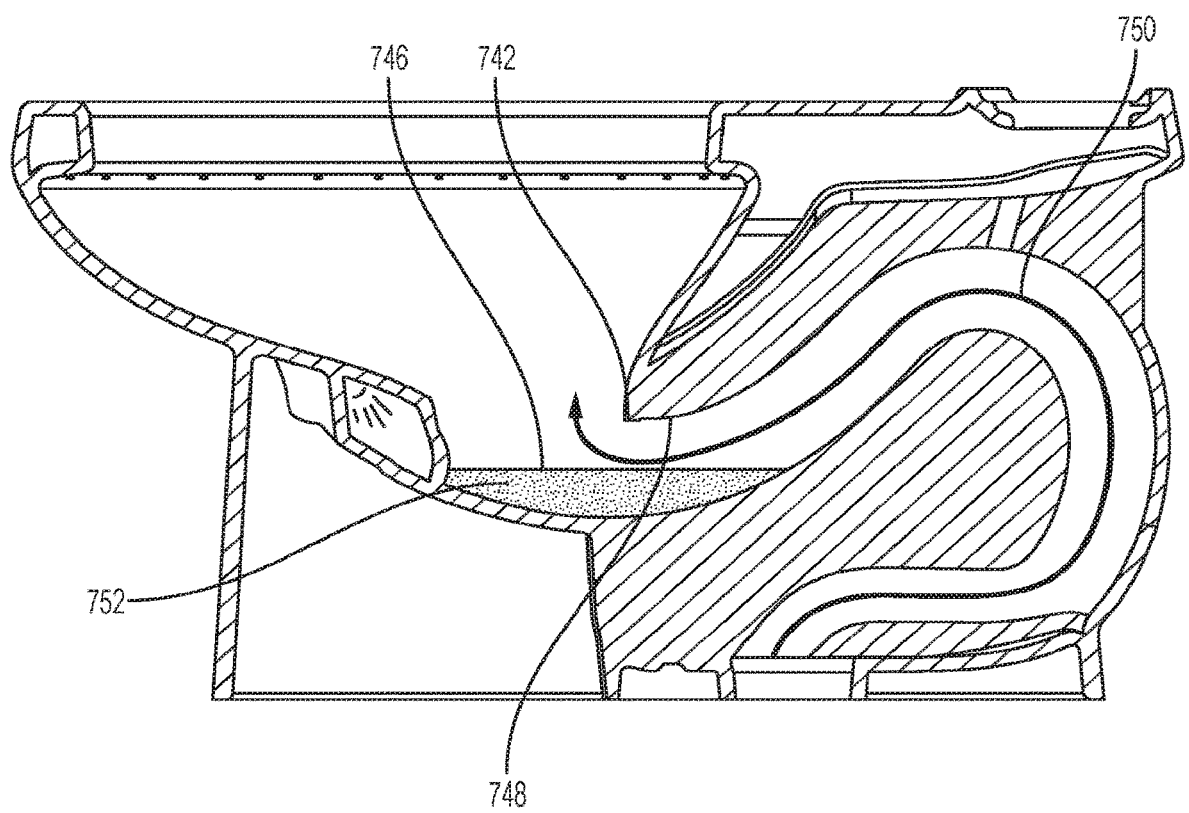
FIG. 7 is a cross section of a toilet where the water level has become so low that the water seal is no longer sufficient.

FIG. 6 and FIG. 7 show a cross section of a toilet illustrating a situation where the system may be used to detect and remedy a "low water" bowl status, thereby preventing the escape of sewer gases into the environment. FIG. 6 shows a toilet bowl 626 in cross section with water in a toilet outlet 652 and having a satisfactory water seal 644, which may be a mechanical water seal 644 with the dimension of the mechanical water seal being 2 inches (i.e., the vertical distance 642 ("VD") between the water surface 646 and the trap dip 648 is 2 inches). The mechanical water seal 644 prevents any sewer gases 650 from backing up through the bowl outlet and escaping into the environment.

FIG. 7 shows a cross section of a toilet where the water surface 746 in the toilet has become so low that the VD 742 (the vertical distance between the water surface 746 and the trap dip 748) is below zero and sewer gases 750 are egressing via the toilet outlet 752 and invention as, upon measurement of a "low water" level, this information is electronically conveyed to the microcontroller and as result an appropriate flush volume of water is delivered to the bowl, such volume in this instance being at least sufficient to restore a minimum VD for the mechanical water seal and therefore to maintain the mechanical water seal and prevent escape of sewer gases into the environment.

Example 1

Figure 8:
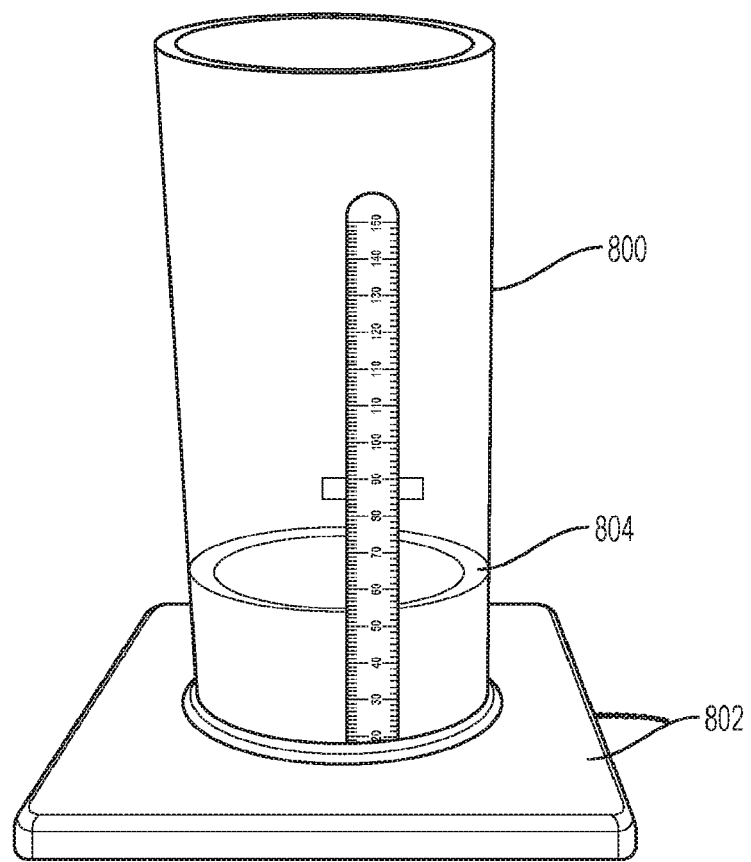
FIG. 8 is a photograph of a PVC tube secured to a ceramic tile to form a small scale toilet bowl as used in the load sensing experiment.

A small scale toilet bowl was replicated by mounting a PVC tube to a ceramic wall tile, as is seen in FIG. 8. A piezo-ceramic sensor from STEM Inc., model SMD15T21 R111WL, was positioned at the bottom of the PVC tube 800 on a bottom surface of the tile 802. The cavity of the PVC tube is filled with a volume of water (about 1.8 kg) to achieve a first water level, "normal" 804 and a "normal" ToF measurement is obtained. Referencing FIG. 9, when water alone is present in the cavity, the distance between "start" and "stop" is the Time of Flight measurement using the calculation: Fluid level=(TOF×Fluid Speed of Sound)/2.

Figure 9:
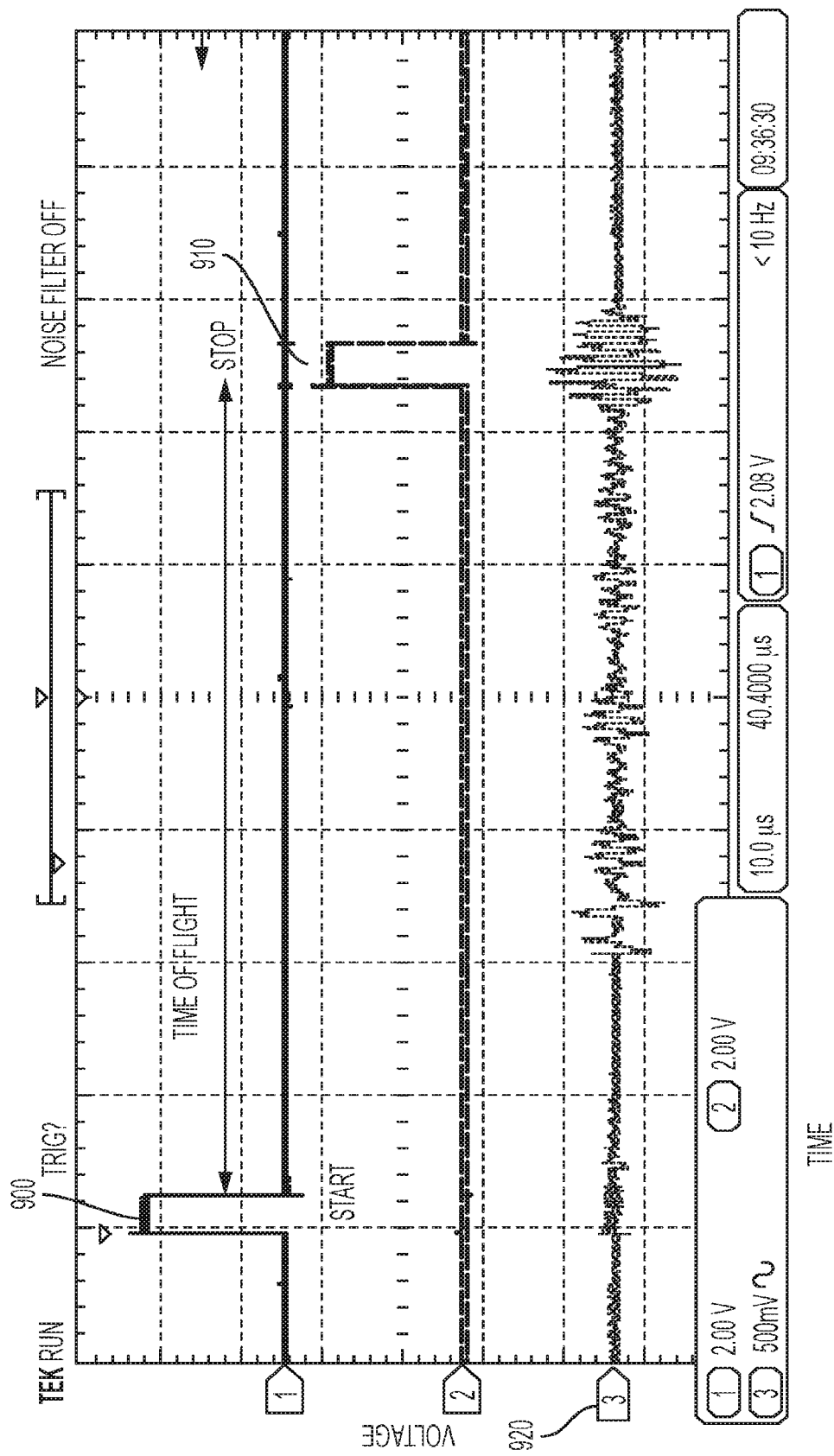
FIG. 9 is a timing diagram representative of the signal generated in the small scale toilet bowl when only liquid is present.

In FIG. 9, data from a sensor used to monitor the exemplary small scale toilet bowl of FIG. 8 is depicted. The graph in FIG. 9 is a voltage versus time plot for the duration of a test when the liquid is at a routine level in the toilet bowl. The data 920 represents the raw ultrasonic signal transmitted and received by the sensor. Data point 900 represents when the AFE sends the start pulse to the sensor and the ultrasonic signal is transmitted from the transducer. Data point 910 represents that the sensor has received the return signal or the receiver (in a transmitter/receiver sensor like FIG. 4) receives the signal. The time between the start position and the stop position is recorded and a ToF measurement is generated. In the example, this time is approximately 60 μs (microseconds). Thus, using the data in FIG. 9, Fluid level=(60 μs×1484 m/s)/2=45 mm. That is, the fluid level in the bowl at the exemplary normal status is 45 mm.

Figure 10:
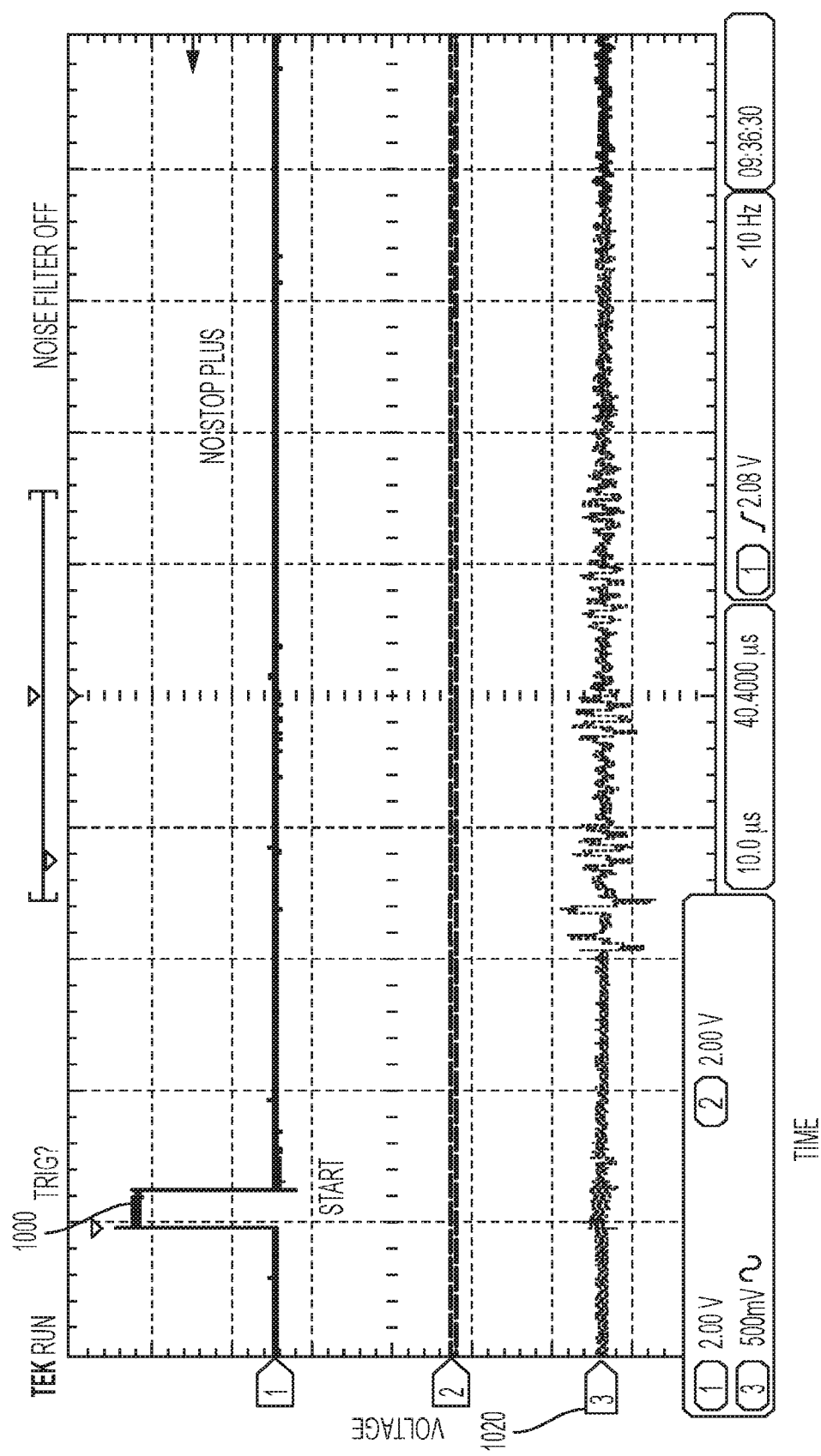
FIG. 10 is a timing diagram representative of the signal generated in the small scale toilet bowl when solids are present.

Referring back to the example of FIG. 8, a portion of miso paste (50 grams) is placed in the PVC tube 800. Referencing FIG. 10, a sensor signal is transmitted and a ToF measurement corresponding to the sensor signal is recorded. Data 1020 represents the raw ultrasonic signal transmitted by the sensor. Data point 1000 represents when the AFE sends the start pulse to the sensor and the ultrasonic signal is transmitted from the transducer. In this example, when there are solids (e.g., miso paste) in the cavity, there is only a "start" because the solids attenuate (or absorb) the signal. That is, the return signal is not received by the sensor. Thus, the ToF measurement is the detection of the absence of a determinable ToF flight. A microcontroller can be programmed to make the distinction between a ToF of about 45 mm and no determinable ToF, and associate each with a "liquid" status and a "solid" status, respectively.

Figure 11A:
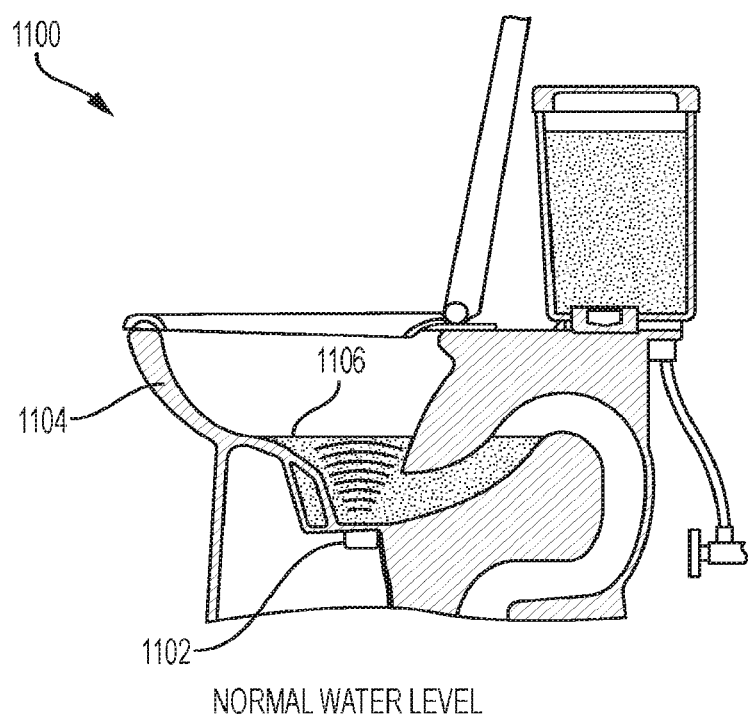
FIG. 11A is a partial cross section of a toilet, according to an embodiment, with a normal water lever.
Figure 11B:
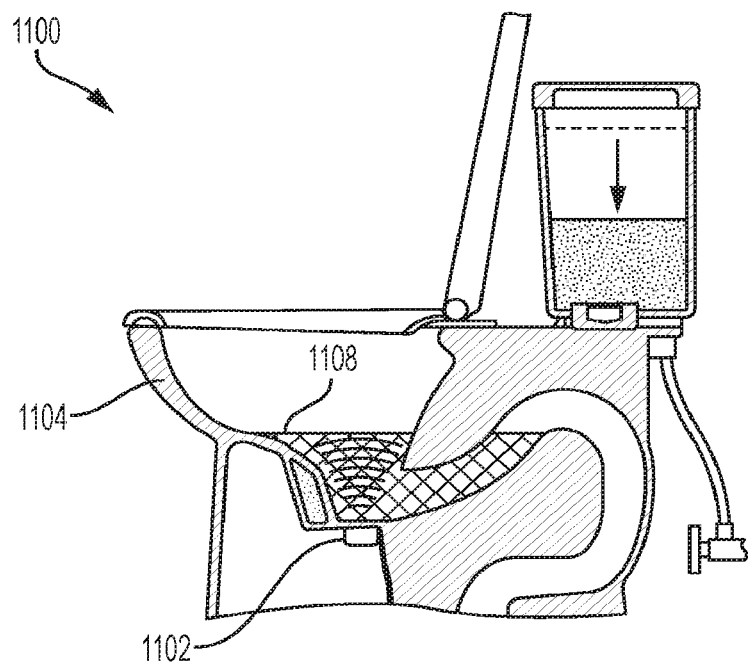
FIG. 11B is a partial cross section of a toilet, according to an embodiment, with a low volume flush.
Figure 11C:
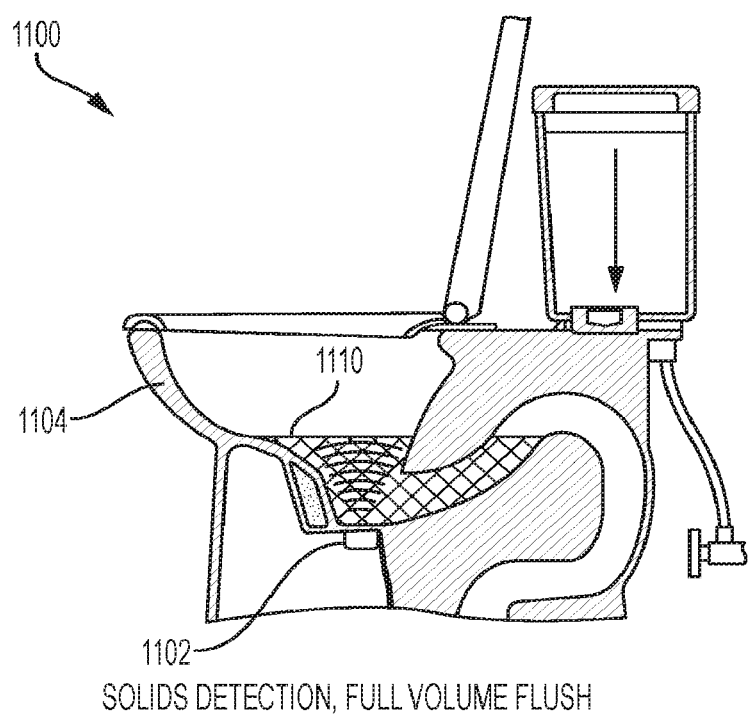
FIG. 11C is a partial cross section of a toilet, according to an embodiment, with a full volume flush.
Figure 11D:
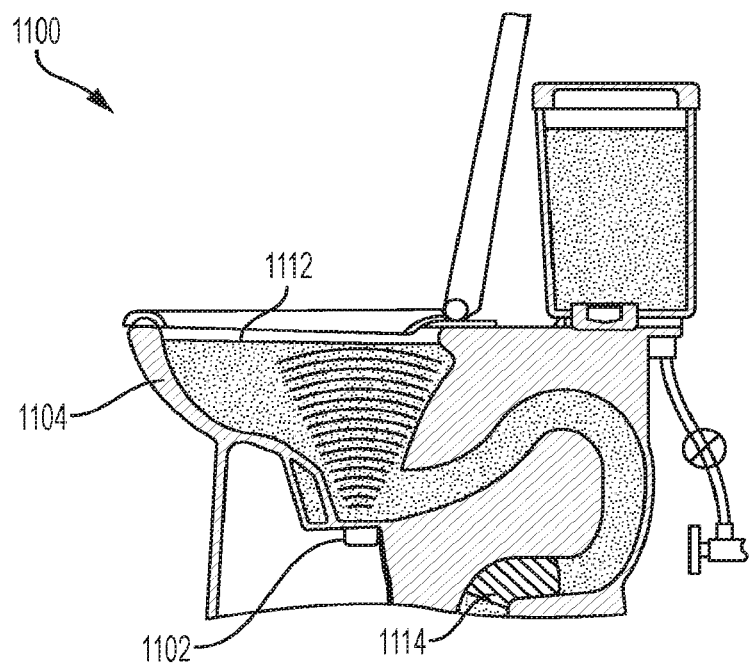
FIG. 11D is a partial cross section of a toilet, according to an embodiment, with an overflow water level.

In FIGS. 11A-11D, various statuses of a toilet 1100 can be seen, according to an embodiment. FIGS. 11A-11D depict a side view of a toilet 1100 with a sensor system 1102. The sensor system 1102 may operate in a manner previously described to communicate with a microcontroller (not depicted) to detect the status of the toilet bowl 1104. In FIG. 11A, the status may be a normal liquid level 1106 and may correspond to the "normal" status ToF measurement to which other statuses are compared. In FIG. 11B, the sensor system 1102 and microcontroller may detect urine 1108 or other light liquid in the toilet bowl 1104. The ToF measurement may be compared to the "normal" status (e.g., the ToF measurement for liquid level 1106). The microcontroller may then actuate a valve in the toilet 1100 to open for a specified time to perform a low-volume flush. In FIG. 11C, the sensor system 1102 and microcontroller may detect solids 1110, such as solid waste, in the toilet bowl 1104. The ToF measurement may be compared to the "normal" status (e.g., the ToF measurement for liquid level 1106). The microcontroller may then actuate a valve in the toilet 1100 to open for a specified time (e.g., a time longer than the time opened for the status of FIG. 11B) to perform a full-volume flush. In FIG. 11D, the sensor system 1102 may detect an overflow condition 1112 in the toilet bowl 1104. The ToF measurement may be compared to the "normal" status (e.g., the ToF measurement for liquid level 1106). The microcontroller may then actuate a valve in the toilet 1100 to close until the clog 1114 or other obstruction is removed from the toilet.

As may be appreciated from the foregoing disclosure—, the system may measure the water level in a toilet bowl. The system may notify of an abnormal condition requiring user intervention. In embodiments, if the water level exceeds a predetermined level, the system may disable an automatic flush and notify of a potential toilet clog or overflow condition. In embodiments, the system may prevent or limit the water damage in a bathroom. The system may detect when content present in the toilet remains in the toilet (e.g., due to an ineffective flush) and the microcontroller may send a signal to issue a subsequent flush.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims. Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

The invention claimed is:

1. A water-flush toilet comprising
a toilet bowl in fluid communication with a water source;
a monitoring system comprising an ultrasonic sensor having a transmitter and a receiver, a secondary sensor, and a microcontroller electrically connected to the ultrasonic sensor and to the secondary sensor; and
a flush valve electrically connected to the microcontroller and disposed between the bowl and the water source,
wherein
the monitoring system is configured to perform a monitoring cycle, the cycle comprising
transmitting an ultrasonic signal towards a bowl contents of the toilet bowl, receiving the ultrasonic signal, determining a Time of Flight (ToF) measurement of the ultrasonic signal, electrically conveying the ToF measurement to the microcontroller, and determining a bowl status corresponding to the ToF measurement,
the secondary sensor is configured to detect a presence of a user on or in a proximity of the toilet bowl, and
the microcontroller determines the bowl status by comparing the ToF measurement to a normal bowl water level ToF measurement.

2. The toilet of claim 1, wherein when the secondary sensor detects the presence of the user, the monitoring system is configured to be activated to perform the monitoring cycle.

3. The toilet of claim 2, wherein the monitoring system is further configured to be manually activated.

4. The toilet of claim 2, wherein the monitoring system is further programmed to be activated at a defined time interval.

5. The toilet of claim 2, wherein the monitoring system is further programmed to be activated once every 24 hours.

6. The toilet of claim 2, wherein the microcontroller is the programmed with a use schedule, and wherein the use schedule further determines when the monitoring system is activated.

7. The toilet of claim 2, wherein the secondary sensor is an infrared sensor.

8. The toilet of claim 1, wherein the normal bowl water level is a water level sufficient to establish a water seal in the toilet bowl.

9. The toilet of claim 7, wherein when the infrared sensor detects the presence of the user and that the user has left the toilet bowl, the monitoring system is activated to perform a monitoring cycle.

10. The toilet of claim 1, wherein the microcontroller is configured to instruct the flush valve to open, to close, or to remain in a current state based on the bowl status.

11. The toilet of claim 10, wherein the bowl status is determined to be "liquid" and the microcontroller instructs the flush valve to move from a closed position to an open position for a duration of time to release a sufficient amount of water to clear the bowl.

12. The toilet of claim 10, wherein the bowl status is determined to be "solids" and the microcontroller instructs the flush valve to move from a closed position to an open position for a duration of time to release a sufficient amount of water to clear the bowl.

13. The toilet of claim 10, wherein the bowl status is determined to be "intermediary" and the microcontroller instructs the flush valve to move from a closed position to an open position for a duration of time to release a sufficient amount of water to clear the bowl.

14. The toilet of claim 10, wherein the bowl status is determined to be "low water" and the microcontroller instructs the flush valve to move from a closed position to an open position for a duration of time to release a sufficient amount of water to restore a water seal.

15. The toilet of claim 1, wherein the microcontroller is configured to instruct a water source valve to open, to close, or to remain in a current state based on the bowl status.

16. The toilet of claim 15, wherein the bowl status is determined to be "leak", "liquid clog", "solid clog", or "object", and the microcontroller instructs the water source valve to move from an open position to a closed position or to remain in a closed position.

17. The toilet of claim 1, wherein the ultrasonic sensor comprises a piezo-ceramic transducer.

18. The toilet of claim 1, wherein the ultrasonic sensor is mounted at an exterior bottom center of the toilet bowl.

19. A system for mounting on a water-flush toilet comprising
an ultrasonic sensor configured to be located at an exterior surface of a toilet bowl, and having a transmitter and a receiver;
a secondary sensor;
a microcontroller electrically connected to the ultrasonic sensor and to the secondary sensor; and
a flush valve electrically connected to the microcontroller, wherein
the system is configured to perform a monitoring cycle to determine a bowl status,
the microcontroller is configured to instruct the flush valve to open, to close, or to remain in a current state based on the bowl status, and
the monitoring cycle comprises transmitting an ultrasonic signal towards a bowl contents of the toilet bowl, receiving the ultrasonic signal, determining a Time of Flight (ToF) measurement of the ultrasonic signal, electrically conveying the ToF measurement to the microcontroller, and determining the bowl status corresponding to the ToF measurement,
the secondary sensor is configured to detect a presence of a user on or in proximity of the toilet bowl, and
the microcontroller determines the bowl status by comparing the ToF measurement to a normal bowl water level ToF measurement.

20. The system of claim 19, wherein the system is configured to detect a "normal", a "leak", a "liquid clog", or a "solid clog" bowl status.

* * * * *